US011029789B2

(12) United States Patent
Zhang et al.

(10) Patent No.: US 11,029,789 B2
(45) Date of Patent: Jun. 8, 2021

(54) TOUCH STRUCTURE AND METHOD OF MANUFACTURING THE SAME, TOUCH SUBSTRATE AND TOUCH DISPLAY DEVICE

(71) Applicants: Wuhan BOE Optoelectronics Technology Co., Ltd., Wuhan (CN); BOE TECHNOLOGY GROUP CO., LTD., Beijing (CN)

(72) Inventors: Wei Zhang, Beijing (CN); Yuanhui Guo, Beijing (CN); Yujie Gao, Beijing (CN); Xiaoyu Huang, Beijing (CN); Xiaoguang Yang, Beijing (CN)

(73) Assignees: Wuhan BOE Optoelectronics Technology Co., Ltd., Wuhan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/860,329

(22) Filed: Apr. 28, 2020

(65) Prior Publication Data

US 2021/0096669 A1   Apr. 1, 2021

(30) Foreign Application Priority Data

Sep. 26, 2019   (CN) .......................... 201910918258.2

(51) Int. Cl.
*G06F 3/044* (2006.01)

(52) U.S. Cl.
CPC .... *G06F 3/044* (2013.01); *G06F 2203/04103* (2013.01); *G06F 2203/04111* (2013.01); *G06F 2203/04112* (2013.01)

(58) Field of Classification Search
CPC ................................. G06F 3/044; G06F 3/045
USPC ......................................................... 345/173
See application file for complete search history.

(56) References Cited

U.S. PATENT DOCUMENTS

| 2016/0018923 A1* | 1/2016 | Zhang | G06F 3/0445 345/174 |
| 2018/0068157 A1* | 3/2018 | Zeng | G06K 9/001 |
| 2019/0220113 A1* | 7/2019 | Zheng | G06K 9/0004 |

* cited by examiner

*Primary Examiner* — Calvin C Ma
(74) *Attorney, Agent, or Firm* — McDermott Will & Emery LLP

(57) ABSTRACT

A touch structure includes a touch functional layer and a first transparent layer. The touch functional layer includes a first conductive layer and a second conductive layer that are stacked. The first conductive layer includes a plurality of electrodes spaced apart from each other. Orthographic projections of the plurality of electrodes and a region between any two adjacent electrodes of the plurality of electrodes on a plane perpendicular to a thickness direction of the touch functional layer is within a range of an orthographic projection of the first transparent layer on the plane.

19 Claims, 12 Drawing Sheets

TOUCH STRUCTURE AND METHOD OF MANUFACTURING THE SAME, TOUCH SUBSTRATE AND TOUCH DISPLAY DEVICE

CROSS-REFERENCE TO RELATED APPLICATION

This application claims priority to Chinese Patent Application No. 201910918258.2 filed on Sep. 26, 2019, which is incorporated herein by reference in its entirety.

TECHNICAL FIELD

The present disclosure relates to the field of touch technologies, and in particular, to a touch structure and a method of manufacturing the same, a touch substrate and a touch display device.

BACKGROUND

With the development of display technologies, touch display devices are becoming more and more widely used. The core component of the touch display device is a touch structure for identifying a touch caused by a finger or a stylus. Since the touch display device does not require external input components such as a keyboard, it has the advantages of small size and convenient operation, and thus is favored by users.

SUMMARY

In one aspect, a touch structure is provided. The touch structure includes a touch functional layer configured to identify a touch and a first transparent layer. The touch functional layer includes a first conductive layer and a second conductive layer that are stacked. The first conductive layer includes a plurality of electrodes spaced apart from each other. Orthographic projections of the plurality of electrodes and a region between any two adjacent electrodes of the plurality of electrodes on a plane perpendicular to a thickness direction of the touch functional layer is within a range of an orthographic projection of the first transparent layer on the plane. The first transparent layer is disposed at a side of the first conductive layer away from the second conductive layer, and a refractive index of the first transparent layer is greater than or equal to a refractive index of the first conductive layer. Or, the first transparent layer is disposed between the first conductive layer and the second conductive layer, a material of the first transparent layer is an insulating material, and the refractive index of the first transparent layer is equal to the refractive index of the first conductive layer.

In some embodiments, the touch structure further includes a second transparent layer. The first transparent layer is disposed at the side of the first conductive layer away from the second conductive layer, the second transparent layer is disposed on a side of the first transparent layer in the thickness direction of the touch functional layer, and the second transparent layer is in contact with the first transparent layer. A refractive index of the second transparent layer is less than the refractive index of the first transparent layer.

In some embodiments, an orthographic projection of the second transparent layer on the plane completely overlaps an orthographic projection of the first transparent layer on the plane.

In some embodiments, the touch structure further includes a second transparent layer. The first transparent layer is disposed between the first conductive layer and the second conductive layer, and the second transparent layer is disposed between the first transparent layer and the second conductive layer. An orthographic projection of the second transparent layer on the plane completely overlaps an orthographic projection of the first transparent layer on the plane.

In some embodiments, the touch structure further includes a second transparent layer. The first transparent layer is disposed between the first conductive layer and the second conductive layer, and the second transparent layer is disposed between the first transparent layer and the first conductive layer. An orthographic projection of the second transparent layer on the plane completely overlaps an orthographic projection of the first conductive layer on the plane.

In some embodiments, a thickness of the second transparent layer satisfies $D=(2k+1)*\lambda/4$. $D$ is the thickness of the second transparent layer, $k$ is a natural number less than or equal to 10, and $\lambda$ is a wavelength of visible light.

In some embodiments, the second transparent layer is disposed between the first transparent layer and the first conductive layer, and the refractive index of the second transparent layer satisfies: $n_3^2 = n_1 * n_2$. $n_1$ is the refractive index of the first conductive layer, $n_2$ is the refractive index of the first transparent layer, $n_3$ is the refractive index of the second transparent layer, and the refractive index of the first conductive layer is not equal to the refractive index of the second conductive layer.

In some embodiments, a material of the second transparent layer is an insulating material.

In some embodiments, the first conductive layer and the second conductive layer are made of silver nanowires.

In another aspect, a touch substrate is provided. The touch substrate includes a base substrate and any one of the touch structures described above. The touch structure is disposed above the base substrate.

In some embodiments, the base substrate is a cover sheet. The first conductive layer in the touch structure is closer to the cover sheet than the second conductive layer.

In yet another aspect, a touch display device is provided. The touch display device includes a display panel and any one of the touch structures described above. The first conductive layer in the touch structure is closer to a light exit surface of the touch display device than the second conductive layer.

In some embodiments, the display panel includes an array substrate, an opposite substrate, and a liquid crystal layer disposed between the array substrate and the opposite substrate. The touch structure is disposed on a surface of the array substrate facing the liquid crystal layer.

In some embodiments, the display panel includes an array substrate, an opposite substrate, and a liquid crystal layer disposed between the array substrate and the opposite substrate. The touch structure is disposed on a surface of the opposite substrate facing away from the liquid crystal layer.

In some embodiments, the display panel includes a display substrate and an encapsulation layer configured to encapsulate the display substrate. The touch structure is disposed on a surface of the encapsulation layer facing away from the display substrate.

In yet another aspect, a method of manufacturing any one of the touch structures described above is provided. The method includes: forming the second conductive layer on a base through a first patterning process; forming the first transparent layer on the second conductive layer; and forming the first conductive layer on the first transparent layer through a second patterning process. A material of the first transparent layer is an insulating material. The refractive index of the first transparent layer is equal to the refractive index of the first conductive layer.

In some embodiments, the step of forming the first conductive layer on the first transparent layer through the second patterning process, includes: forming a first conductive film on the first transparent layer, and patterning the first conductive film to form the first conductive layer.

In some embodiments, after forming the first transparent layer, the method further includes: forming a second transparent film on the first transparent layer, and the step of forming the first conductive layer includes forming a first conductive film on the second transparent film. The first conductive film and the second transparent film are simultaneously processed through a same patterning process to form the first conductive layer and a second transparent layer, and an orthographic projection of the second transparent layer on the base completely overlaps an orthographic projection of the first conductive layer on the base.

In some embodiments, the first conductive film is made of silver nanowires, and the second patterning process includes a laser process.

BRIEF DESCRIPTION OF THE DRAWINGS

In order to describe technical solutions in the embodiments of the present disclosure more clearly, accompanying drawings to be used in some embodiments of the present disclosure will be introduced briefly. Obviously, the accompanying drawings to be described below are merely accompanying drawings of some embodiments of the present disclosure, and a person of ordinary skill in the art can obtain other drawings according to these drawings. In addition, accompanying drawings in the following description may be regarded as schematic diagrams, and are not limitations on an actual size of a product, and an actual process of a method that the embodiments of the present disclosure relate to.

DETAILED DESCRIPTION

Figure 1A:
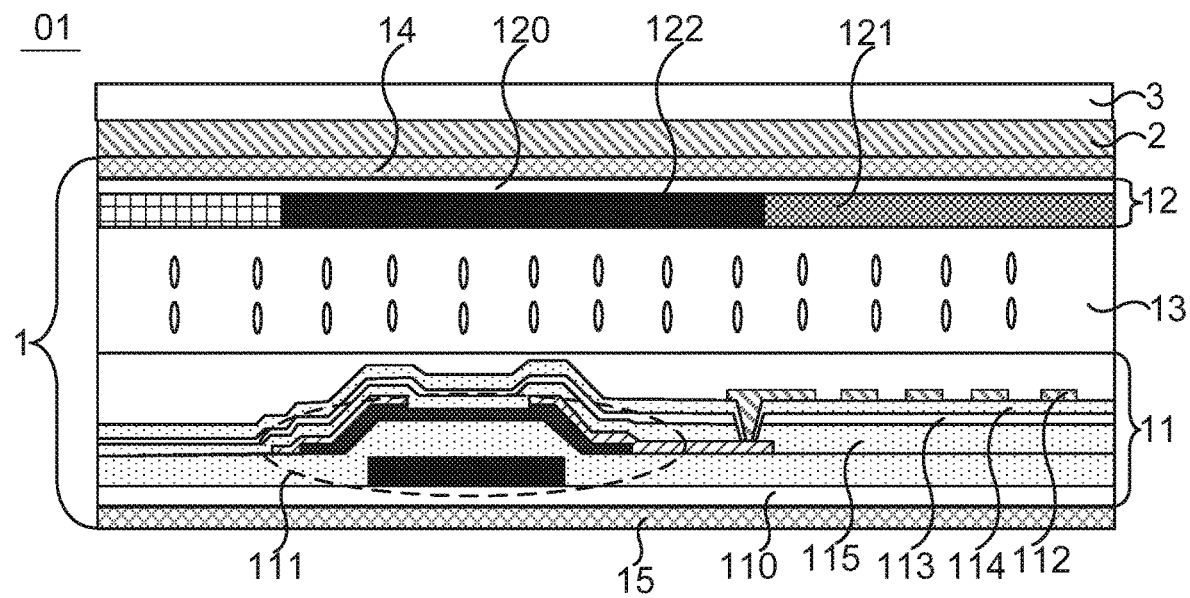
FIG. 1A is a schematic structural diagram of a liquid crystal display device with a touch function according to some embodiments.

Technical solutions in some embodiments of the present disclosure will be described clearly and completely with reference to accompanying drawings. Obviously, the described embodiments are merely some but not all of the embodiments of the present disclosure. All other embodiments obtained on a basis of the embodiments of the present disclosure by a person of ordinary skill in the art shall be included in the protection scope of the present disclosure.

Unless the context requires otherwise, the term "comprise" and other forms thereof such as the third-person singular form "comprises" and the present participle form "comprising" in the description and the claims are construed as open-ended and inclusive, i.e., "include, but not limited to". In the description of the description, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to same embodiment(s) or example(s). In addition, the specific features, structures, materials or characteristics may be included in any one or more embodiments or examples in any suitable manner.

Terms such as "first" and "second" are used for descriptive purposes only and are not to be construed as indicating or implying the relative importance or implicitly indicating the number of indicated technical features below. Therefore, a feature defined by the term "first" or "second" may include one or more of the features, either explicitly or implicitly. In the description of the embodiments of the present disclosure, the term "plurality" means two or more unless otherwise specified.

In the description of some embodiments, terms such as "connected" and its extensions may be used. For example, the term "connected" may be used in the description of some embodiments to indicate that two or more components are in direct physical or electrical contact with each other. However, terms such as "connected" may also mean that two or more components are not in direct contact with each other but still cooperate or interact with each other. The embodiments disclosed herein are not necessarily limited to the contents herein.

Orientations or positional relationships indicated by terms "up/above", "down/below" and the like are based on the orientations or positional relationships shown in the accompanying drawings, and are merely for convenience of explanation of the technical solution of the embodiments of the present disclosure, and are not intended to indicate or imply that a referred device or component must have a particular orientation, and must be constructed and operated in a particular orientation. Therefore, they cannot be construed as limitations to the contents herein.

Some embodiments of the present disclosure provide a touch display device. The touch display device is, for example, a liquid crystal display (LCD) device with a touch function, an electroluminescent display device with a touch function, or a photoluminescent display device with a touch function. In addition, the electroluminescent display device is, for example, an organic light-emitting diode (OLED) display device or a quantum dot light-emitting diodes (QLED) display device. The photoluminescence display device is, for example, a quantum dot photoluminescence display device.

Figure 1B:
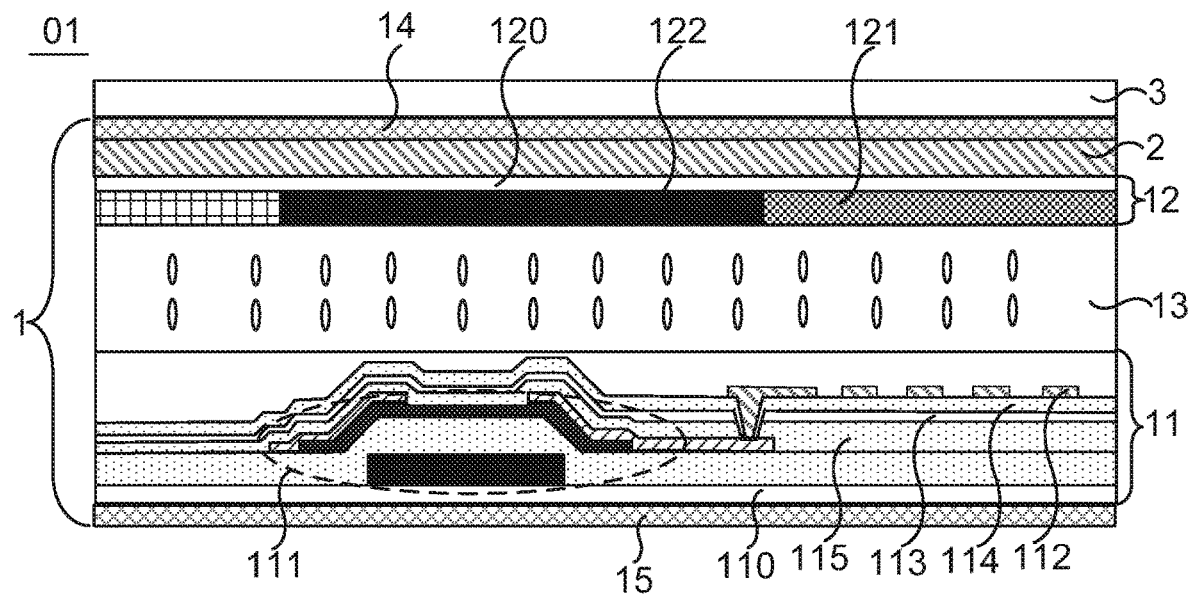
FIG. 1B is a schematic structural diagram of another liquid crystal display device with a touch function according to some embodiments.
Figure 1C:
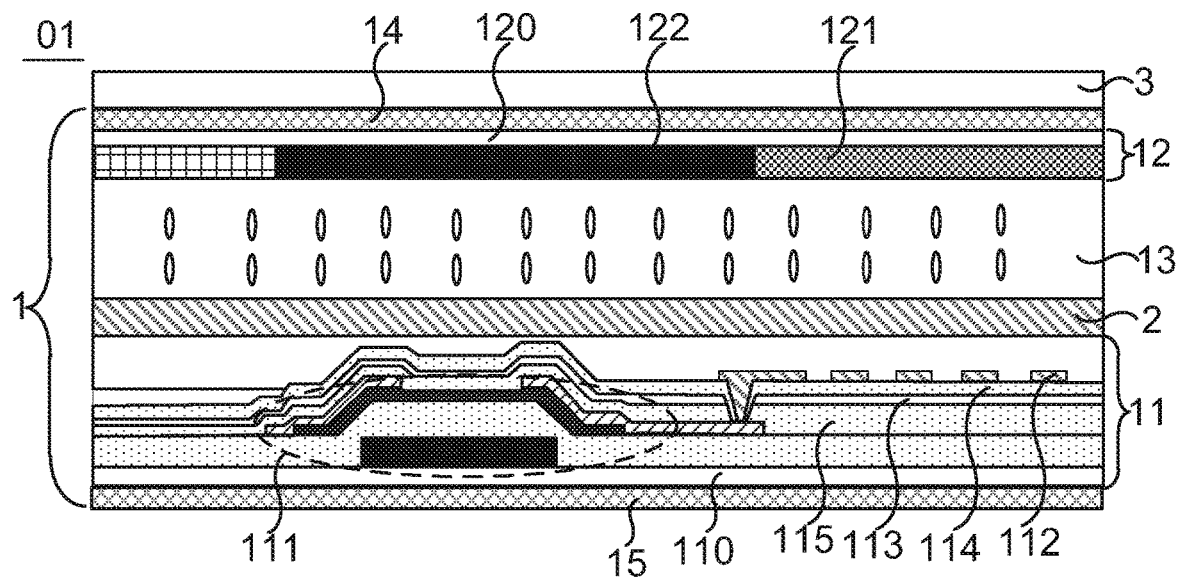
FIG. 1C is a schematic structural diagram of yet another liquid crystal display device with a touch function according to some embodiments.

FIGS. 1A to 1C are schematic diagrams showing structures of liquid crystal display devices with a touch function. For example, the touch display device is a liquid crystal display device, and as shown in FIGS. 1A, 1B and 1C, the liquid crystal display device 01 includes a cover sheet 3, a touch structure 2, a liquid crystal display panel 1, and a backlight module. The backlight module is configured to provide light for the liquid crystal display panel 1.

As shown in FIGS. 1A, 1B and 1C, the liquid crystal display panel 1 includes an array substrate 11, an opposite substrate 12, and a liquid crystal layer 13 disposed between the array substrate 11 and the opposite substrate 12.

In some embodiments, as shown in FIGS. 1A, 1B and 1C, the array substrate 11 includes a first base 110, and a thin film transistor 111 and a pixel electrode 112 that are disposed above the first base 110 and disposed in each sub-pixel. The thin film transistor 111 includes an active layer, a source electrode, a drain electrode and a gate electrode. The array substrate 11 further includes a gate insulating layer disposed between the gate electrode and the active layer. The source electrode and the drain electrode are in contact with the active layer, and the pixel electrode 112 is electrically connected to the drain electrode of the thin film transistor 111. Since the source electrode and the drain electrode of the thin film transistor 111 are generally symmetrical in structure, there is no difference between the source electrode and the drain electrode. In some examples, in order to distinguish one of two electrodes of the same thin film transistor 111 other than the gate electrode from the other, one electrode is referred to as a source electrode, and the other electrode is referred to as a drain electrode. Of course, the thin film transistor 111 may also be replaced with other electronic components having a switching characteristic.

The thin-film transistor 111 is, for example, a bottom-gate thin film transistor, a top-gate thin film transistor, or a dual-gate thin film transistor. In FIGS. 1A, 1B and 1C, that the thin film transistor is a bottom-gate thin film transistor is used as an example for illustration.

In some embodiments, as shown in FIGS. 1A, 1B and 1C, the array substrate 11 further includes a common electrode 113 disposed above the first base 110. In some examples, the pixel electrode 112 and the common electrode 113 are disposed in the same layer. In this case, both the pixel electrode 112 and the common electrode 113 have, for example, a comb structure and include a plurality of strip-shaped sub-electrodes. In some other examples, the pixel electrode 112 and the common electrode 113 are disposed in different layers. In this case, as shown in FIGS. 1A, 1B and 1C, the array substrate 11 further includes a first insulating layer 114 disposed between the pixel electrode 112 and the common electrode 113. For example, the common electrode 113 is disposed between the thin film transistor 111 and the pixel electrode 112, and as shown in FIGS. 1A, 1B and 1C, the array substrate 11 further includes a second insulating layer 115 disposed between the common electrode 113 and the thin film transistor 111.

In some other embodiments, the common electrode 113 is disposed in the opposite substrate 12.

In some embodiments, as shown in FIGS. 1A, 1B and 1C, the opposite substrate 12 includes a second base 120 and a color filter layer 121 disposed on the second base 120. In this case, the opposite substrate 12 may also be referred to as a color filter (CF) substrate. The color filter layer 121 includes at least a filter unit of a first color, a filter unit of a second color, and a filter unit of a third color. Each of the filter unit of the first color, the filter unit of the second color, and the filter unit of the third color is disposed in a sub-pixel. Herein, the first color, the second color, and the third color are three primary colors, such as red, green, and blue, respectively. The opposite substrate 12 further includes a black matrix 122 disposed on the second base 120, and the black matrix 122 is used to space the filter unit of the first color, the filter unit of the second color, and the filter unit of the third color apart from each other.

As shown in FIGS. 1A, 1B and 1C, the liquid crystal display panel 1 further includes an upper polarizer 14 disposed on a side of the opposite substrate 12 away from the liquid crystal layer 13 and a lower polarizer 15 disposed on a side of the array substrate 11 away from the liquid crystal layer 13.

In some embodiments, as shown in FIGS. 1A and 1B, the touch structure 2 is disposed at a side of the opposite substrate 12 away from the array substrate 11. As shown in FIG. 1A, the touch structure 2 may be disposed between the cover sheet 3 and the upper polarizer 14. For example, the touch structure 2 is directly disposed on a surface of the cover sheet 3 facing the upper polarizer 14. Or, as shown in FIG. 1B, the touch structure 2 may be disposed between the upper polarizer 14 and the opposite substrate 12. For example, the touch structure 2 is disposed on a surface of the second base 120 facing away from the array substrate 11.

In some other embodiments, as shown in FIG. 1C, the touch structure 2 is disposed at a side of the opposite substrate 12 proximate to the array substrate 11. That is, the touch structure 2 is disposed between the first base 110 and the second base 120, for example, disposed on the array substrate 11.

Figure 2A:
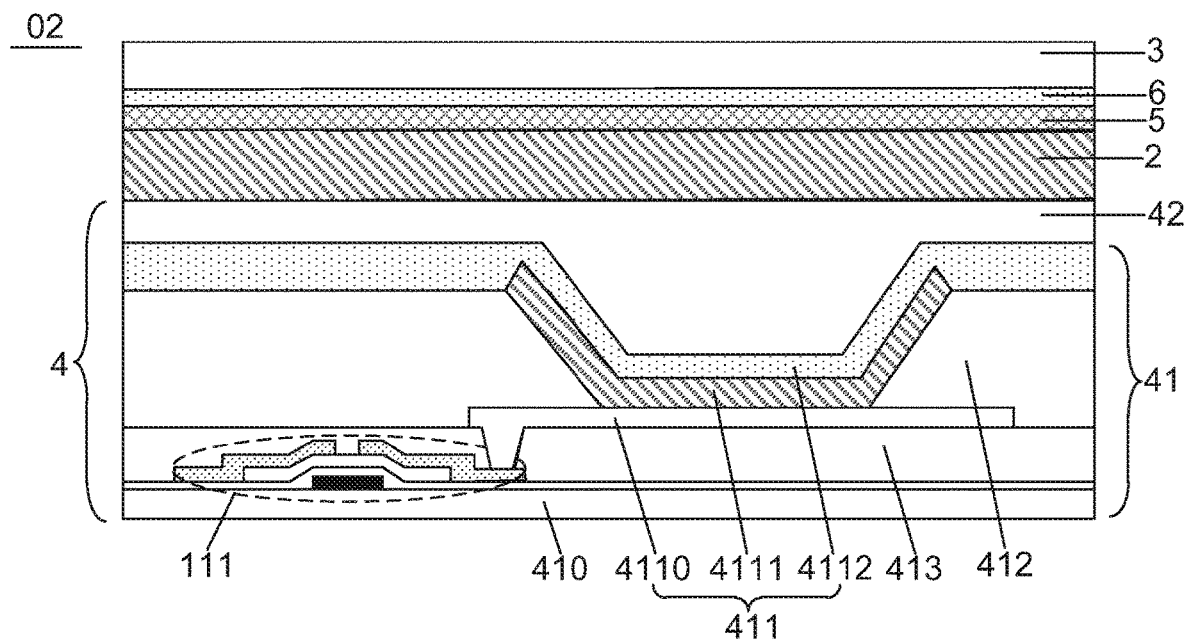
FIG. 2A is a schematic structural diagram of an electroluminescent display device with a touch function according to some embodiments.
Figure 2B:
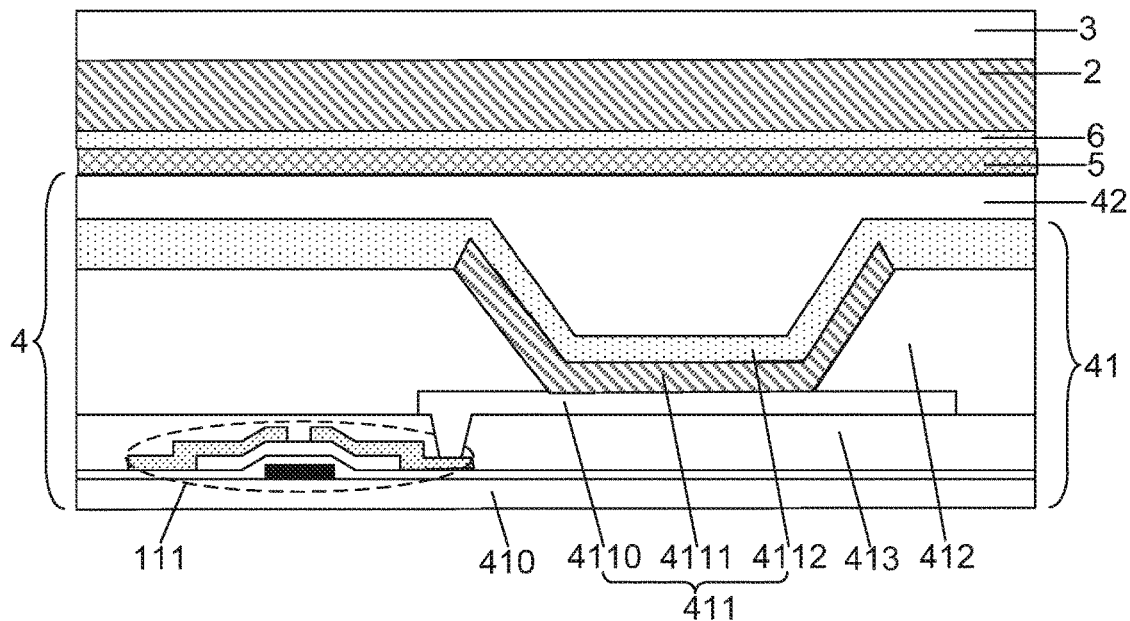
FIG. 2B is a schematic structural diagram of another electroluminescent display device with a touch function according to some embodiments.

FIGS. 2A and 2B are schematic diagrams showing structures of electroluminescent display devices with a touch function. For example, the touch display device is a electroluminescent display device, and as shown in FIGS. 2A and 2B, the electroluminescent display device 02 includes an electroluminescent display panel 4, a touch structure 2, a polarizer 5, a first optically clear adhesive (OCA) 6 and a cover sheet 3.

As shown in FIGS. 2A and 2B, the electroluminescent display panel 4 includes a display substrate 41 and an encapsulation layer 42 for encapsulating the display substrate 41. Herein, the encapsulation layer 42 may be an encapsulation film or an encapsulation plate.

In some embodiments, as shown in FIGS. 2A and 2B, the display substrate 41 includes a third base 410, and a light-emitting device 411 and a driving circuit that are provided above the third base 410 and disposed in each sub-pixel. The driving circuit includes a plurality of thin film transistors 111, and one of the plurality of thin film transistors 111 is used as a driving transistor. The light-emitting device 411 includes an anode 4110, a light-emitting functional layer 4111, and a cathode 4112. The anode 4110 is electrically connected to a drain electrode of the driving transistor. As shown in FIGS. 2A and 2B, the display substrate 41 further includes a planarization layer 413 disposed between the plurality of thin film transistors 111 and the anode 4110.

In some examples, the light-emitting functional layer 4111 includes a light-emitting layer. In some other examples, in addition to the light-emitting layer, the light-emitting functional layer 4111 further includes at least one of an electron transporting layer (ETL), an electron injection layer (EIL), a hole transporting layer (HTL), or a hole injection layer (HIL).

The light-emitting device 411 is, for example, a bottom-emission light-emitting device, a top-emission light-emitting device, or a double-sided emission light-emitting device. Herein, light emitted by the bottom-emission light-emitting device exits from the display device 02 in a direction toward the third base 410; light emitted by the top-emission light-emitting device exits from the display device 02 in a direction facing away from the third base 410; and light emitted by the double-sided emission light-emitting device exits from the display device 02 in directions toward the third base 410 and facing away from the third base 410.

As shown in FIGS. 2A and 2B, the display substrate 41 further includes a pixel defining layer 412 disposed on a surface of the planarization layer 413 facing away from the third base 410 includes a plurality of openings, and each opening corresponds to one light-emitting device 411.

In some embodiments, as shown in FIGS. 2A and 2B, the touch structure 2 is disposed at the light exit surface of the electroluminescent display panel 4. In some examples, as shown in FIG. 2A, the touch structure 2 is disposed between the polarizer 5 and the encapsulation layer 42. For example, the touch structure 2 is directly disposed on the encapsulation layer 42, that is, no other film layers are disposed between the touch structure 2 and the encapsulation layer 42. In some other examples, as shown in FIG. 2B, the touch structure 2 is disposed between the cover sheet 3 and the first OCA 6. For example, the touch structure 2 is directly disposed on a surface of the cover sheet 3 facing the polarizer 5.

Herein, the light exit surface of any display panel refers to a surface of the display panel, through which light emitted by the light-emitting device exits from the display panel.

A structure of the photoluminescence display device is similar to that of the electroluminescent display device 02. With respect to the structure of the photoluminescence display device, reference may be made to the structure of the aforesaid electroluminescent display device, and details are not described herein again.

In a case where the touch display device is the electroluminescent display device or the photoluminescence display device, the touch display device is easier to be made into a flexible display device.

Figure 3A:
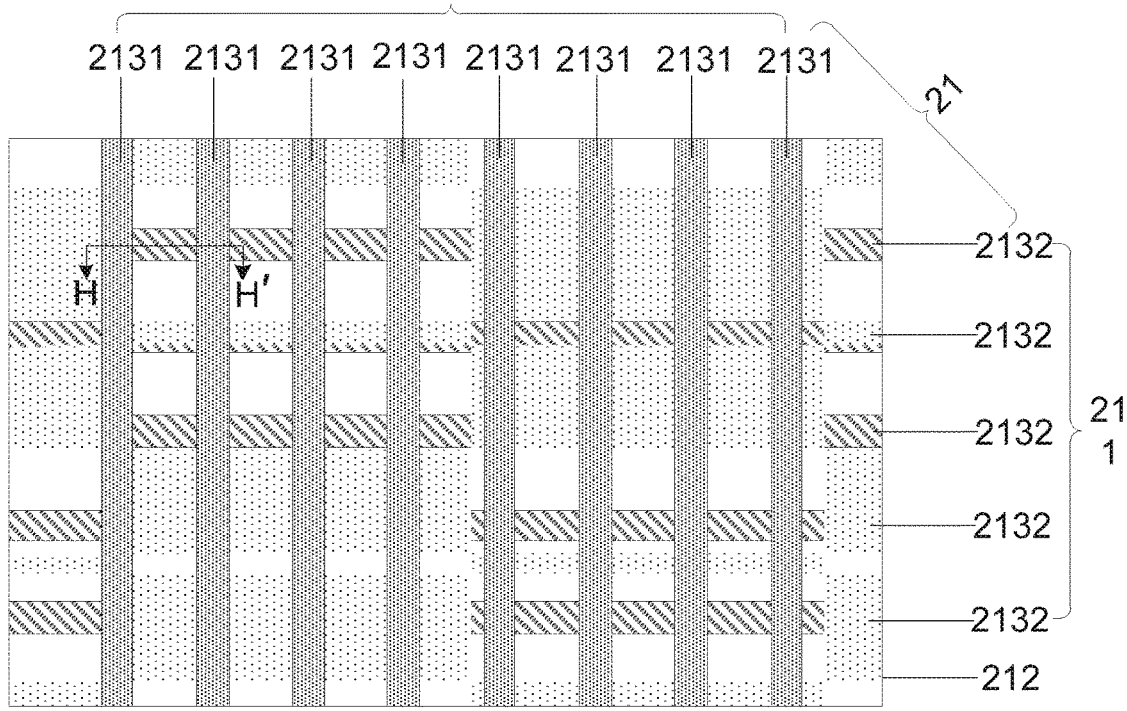
FIG. 3A is a top view of a touch structure in the related art.
Figure 3B:
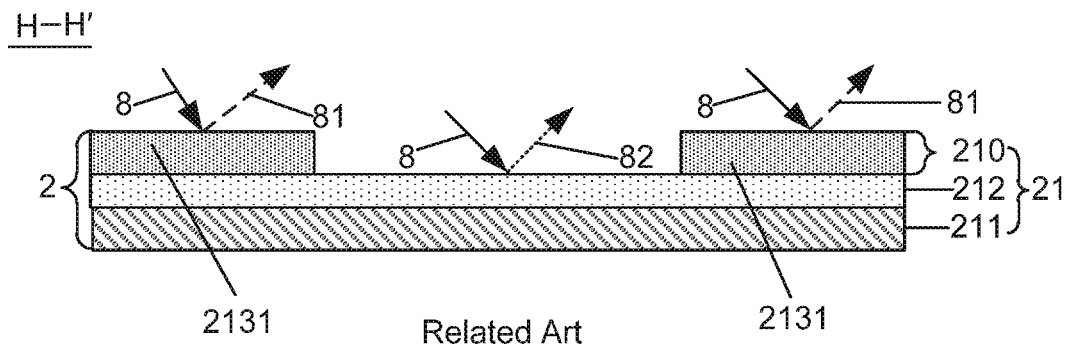
FIG. 3B is a cross-sectional view of the touch structure in the H-H' direction in FIG. 3A.

In the related art, as shown in FIGS. 3A and 3B, the touch structure 2 includes a first conductive layer 210, a second conductive layer 211, and an insulating layer 212 between the first conductive layer 210 and the second conductive layer 211. The first conductive layer 210 and the second conductive layer 211 constitute a touch functional layer 21 of the touch structure 2. In a case where the touch structure 2 is applied to a touch display device, the first conductive layer 210 is closer to a light exit surface of the touch display device than the second conductive layer 211.

The light exit surface of the touch display device herein refers to a surface of the touch display device through which the light exits from the display device.

On this basis, as shown in FIG. 3B, incident light 8 from the environment to the touch functional layer 21 is converted into first reflected light 81 after being reflected by the first conductive layer 210 and converted into second reflected light 82 after being reflected by the insulating layer 212. Since a material of the first conductive layer 210 and a material of the insulating layer 212 are different, the refractive index and the reflectance of the first conductive layer 210 are different from the refractive index and the reflectance of the insulating layer 212, respectively. In a case where the refractive index of the first conductive layer 210 is greater than the refractive index of the insulating layer 212, the intensity of the first reflected light 81 is greater than the intensity of the second reflected light 82. Therefore, when eyes receive the first reflected light 81 and the second reflected light 82 that have different intensities, the eyes may be able to see shapes of first electrodes 2131 in the first conductive layer 210, for example, as shown in FIG. 3A, the shapes of a plurality of strip-shaped first electrodes 2131, thereby affecting the display effect of the touch display device.

The term "reflectance" herein refers to, for a ray of light at an interface, a ratio of energy of reflected light to energy of incident light.

The term "transmittance" herein refers to a ratio of radiation energy transmitted through an object to total radiation energy incident onto the object in a process of incident light entering the object through an incident surface and then exiting through another surface.

In some embodiments of the present disclosure, as shown in FIGS. 4A to 4E, the touch structure 2 includes a touch functional layer 21 configured to identify a touch, and a first transparent layer 22. The touch functional layer 21 includes a first conductive layer 210 and a second conductive layer 211 that are stacked. The first conductive layer 210 includes a plurality of electrodes 213 that are spaced apart from each other.

In some embodiments, the touch structure 2 further includes an insulating layer 212 disposed between the first conductive layer 210 and the second conductive layer 211.

In some examples, as shown in FIGS. 4B to 4E, the first transparent layer 22 is disposed at a side of the first conductive layer 210 away from the second conductive layer 211, and orthographic projections of the electrodes 213 in the first conductive layer 210 and a region between any two adjacent electrodes of the electrodes 213 on a plane perpendicular to a thickness direction of the touch functional layer 21 is within a range of an orthographic projection of the first transparent layer 22 on the plane. A refractive index of the first transparent layer 22 is greater than or equal to the refractive index of the first conductive layer 210. The first transparent layer 22 covers, for example, an region where the entire touch functional layer 21 is located. For example, the touch structure 2 is applied to a touch display device, the touch functional layer 21 is located in a display area, and the first transparent layer 22 covers the display area.

Figure 4A:
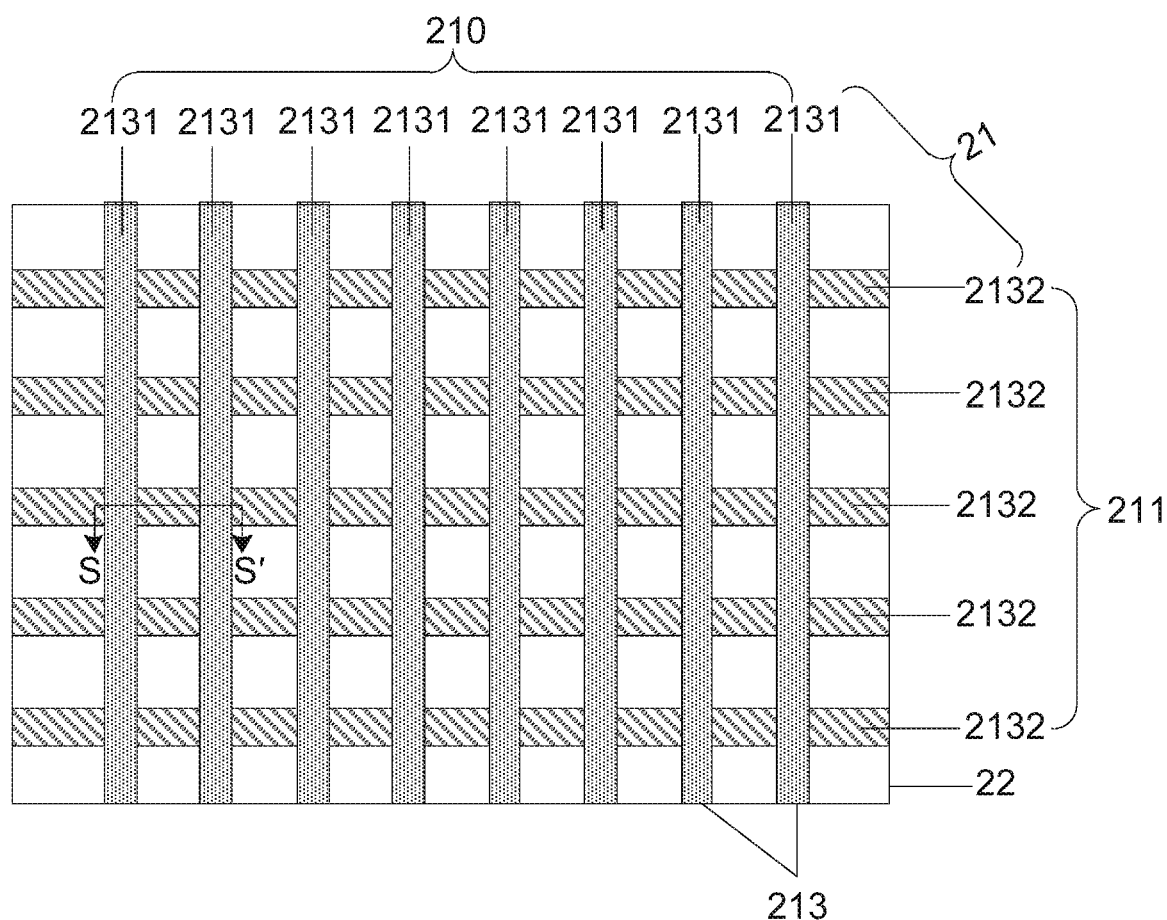
FIG. 4A is a top view of a touch structure according to some embodiments.
Figure 4B:
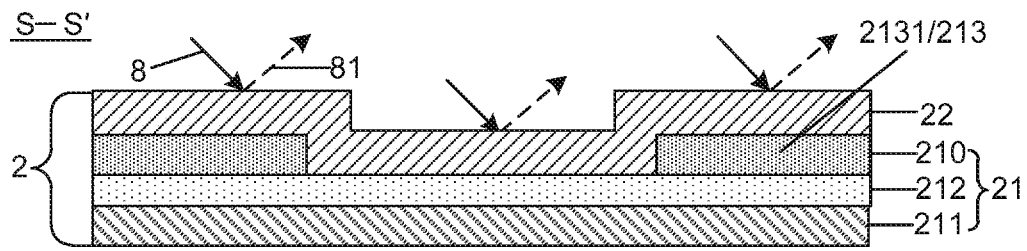
FIG. 4B is a cross-sectional view of the touch structure in the S-S' direction in FIG. 4A.
Figure 4C:
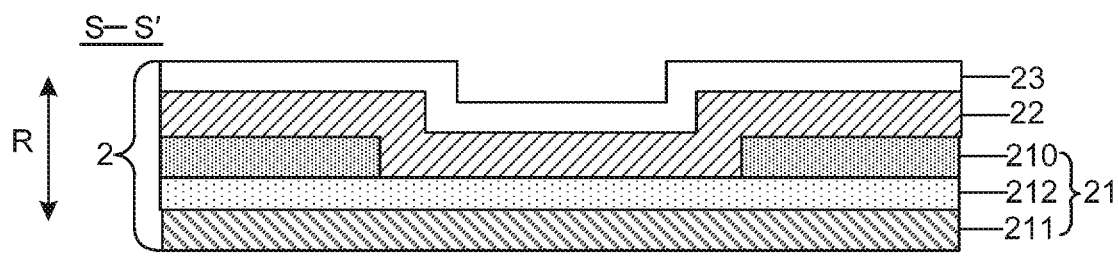
FIG. 4C is a cross-sectional view of another touch structure in the S-S' direction in FIG. 4A.

Herein, the thickness direction of the touch functional layer 21 is, for example, a vertical direction R as shown in FIG. 4C.

In some embodiments, the touch structure 2 further includes a base configured to carry the first conductive layer 210, the second conductive layer 211, the insulating layer 212, and electrode wires. For example, the touch structure 2 is disposed at a surface of a display panel, and the base of the touch structure 2 is a layer in the display panel disposed at the light exit surface of the display panel. For another example, the touch structure 2 is integrated into the display panel, and the base of the touch structure 2 is a certain layer in the display panel. That is, the layer at the surface of the display panel or the layer inside the display panel may be directly used as the base of the touch structure 2 on which structures, such as the first conductive layer 210 and the second conductive layer 211, are disposed. Of course, the touch structure 2 may also includes an independent base, and in a case where the touch structure is applied to a touch display device, the base of the touch structure 2 may be bonded to the display panel.

Figure 5A:
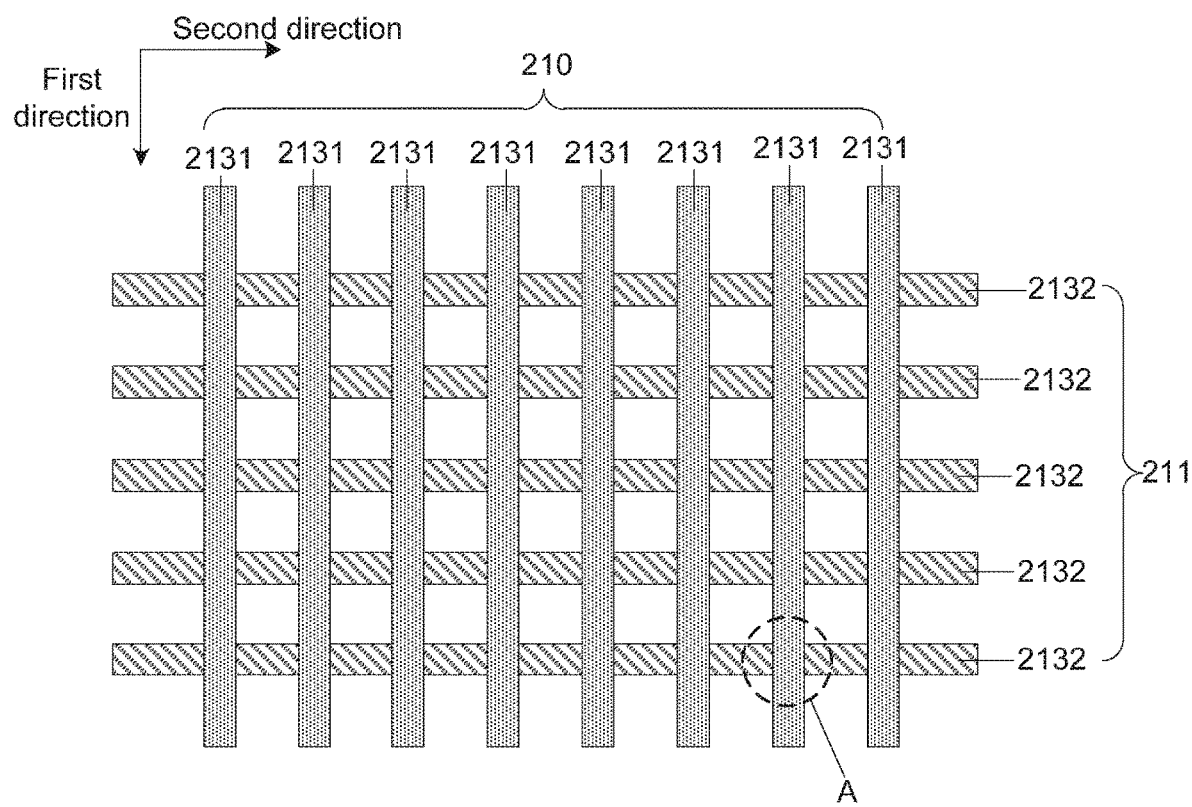
FIG. 5A is a schematic structural diagram of a touch functional layer according to some embodiments.

FIG. 5A is a schematic diagram showing a structure of the touch functional layer 21. For example, as shown in FIG. 5A, the first conductive layer 210 includes a plurality of first electrodes 2131 spaced apart from each other and the first electrode 2131 extends in the first direction. The second conductive layer 211 includes a plurality of second electrodes 2132 spaced apart from each other and the second electrode 2132 extends in a second direction. The first direction and the second direction intersect. FIG. 5A illustrates an example where the first electrodes 2131 extend in a vertical direction and the second electrodes 2132 extend in a horizontal direction. In this case, the first electrodes 2131 in FIG. 5A are electrodes 213 in the first conductive layer 210.

Figure 5B:
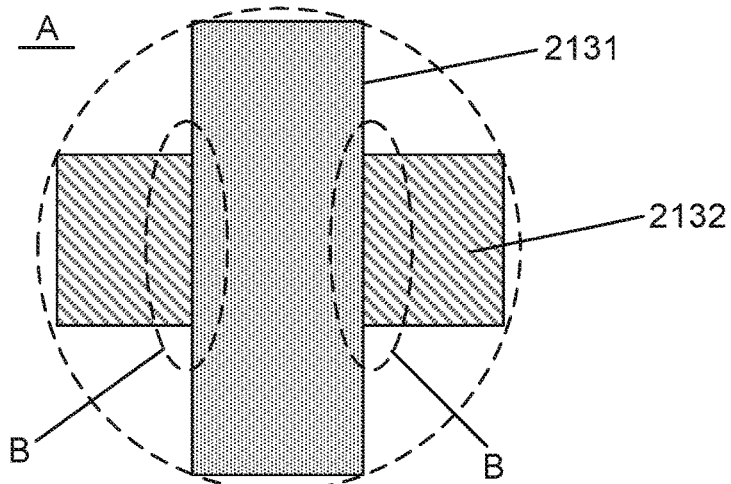
FIG. 5B is an enlarged diagram of the region A in FIG. 5A.
Figure 5C:
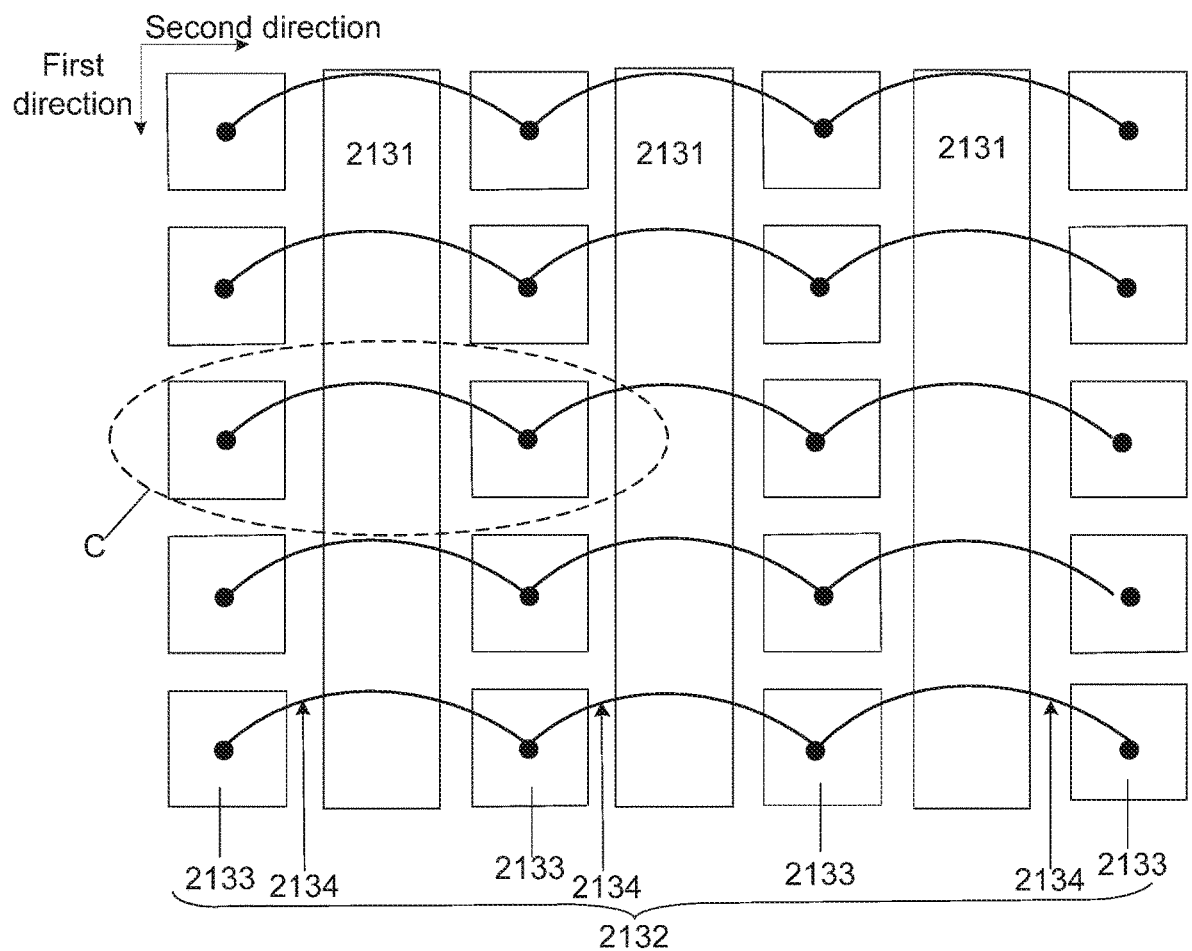
FIG. 5C is a schematic structural diagram of another touch functional layer according to some embodiments.
Figure 5D:
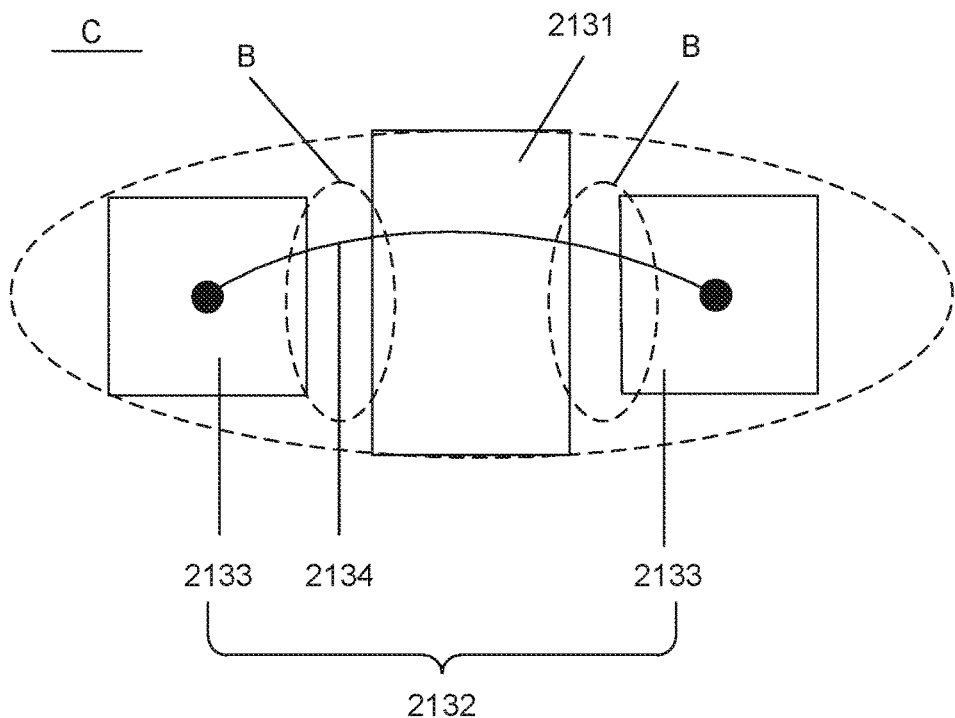
FIG. 5D is an enlarged diagram of the region C in FIG. 5C.
Figure 5E:
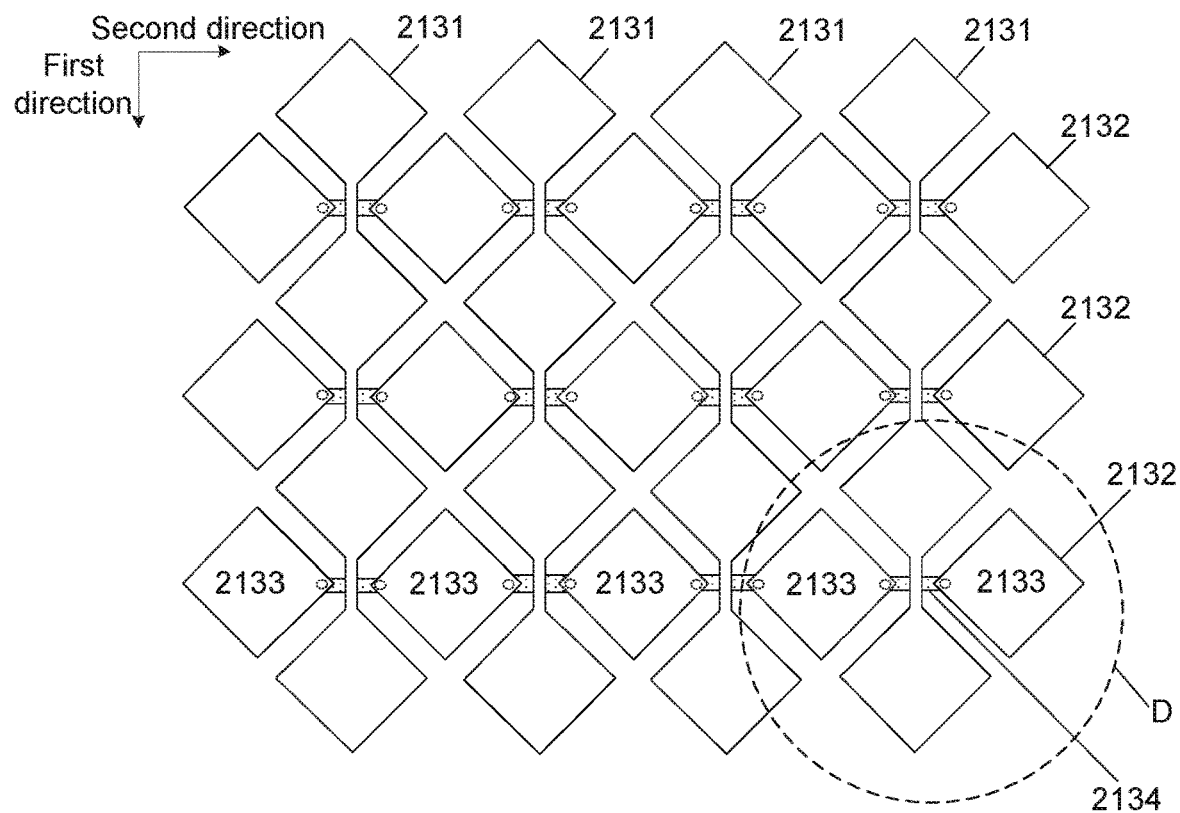
FIG. 5E is a schematic structural diagram of yet another touch functional layer according to some embodiments.

FIGS. 5C and 5E are schematic diagrams showing another two structures of the two touch functional layer 21. For example, as shown in FIGS. 5C and 5E, the first conductive layer 210 includes a plurality of first electrodes 2131 spaced apart from each other and a plurality of groups of second sub-electrodes 2133. The first electrode 2131 extends in the first direction, and each group of second sub-electrodes 2133 includes a plurality of second sub-electrodes 2133 spaced apart from each other and arranged in the second direction. Two adjacent second sub-electrodes 2133 in a group of second sub-electrodes 2133 are spaced apart by one first electrode 2131. The plurality of first electrodes 2131 are insulated from all second sub-electrodes 2133. The second conductive layer 211 includes a plurality of bridges 2134, and each bridge 2134 is used to connect two adjacent second sub-electrodes 2133 in a corresponding group of second sub-electrodes 2133. A group of second sub-electrodes 2133 and a plurality of bridges 2134 that are used to electrically connect all second sub-electrodes 2133 in the group of the second sub-electrodes 2133 constitute a second electrode 2132. In this case, the plurality of first electrodes 2131 and the plurality of second sub-electrodes 2133 in FIGS. 5C and 5E are the plurality of electrodes 213 in the first conductive layer 210.

For another example, the second conductive layer 211 includes a plurality of first electrodes 2131 spaced apart from each other and a plurality of groups of second sub-electrodes 2133. The first electrode 2131 extends in the first direction, and each group of second sub-electrodes includes a plurality of second sub-electrodes 2133 spaced apart from each other and arranged in the second direction. Two adjacent second sub-electrodes 2133 in a group of second sub-electrodes 2133 are spaced apart by one first electrode 2131. The plurality of first electrodes 2131 are insulated from all second sub-electrodes 2133. The first conductive layer 210 includes a plurality of bridges 2134, and each bridge 2134 is used to connect two adjacent second sub-electrodes 2133 in a corresponding group of second sub-electrodes 2133. A group of second sub-electrodes 2133 and a plurality of bridges 2134 that are used to electrically connect all second sub-electrodes 2133 in the group of the second sub-electrodes 2133 constitute a second electrode 2132. In this case, the plurality of bridges 2134 are the plurality of electrodes 213 in the first conductive layer 210.

FIG. 5C illustrates an example where the shapes of the first electrodes 2131 and the second sub-electrodes 2133 are both rectangular, the first electrodes 2131 extend in the vertical direction, and a plurality of second sub-electrodes 2133 in each group of the second sub-electrodes are arranged in the horizontal direction.

FIG. 5E illustrates an example where the shape of the first electrode 2131 and the shape of the second sub-electrode 2133 are both rhombus, the first electrode 2131 extends in the vertical direction, and a plurality of second sub-electrodes 2133 in each group of second sub-electrodes are arranged in the horizontal direction.

Those skilled in the art will understand that the first electrodes 2131 and the second electrodes 2132 are insulated from each other to realize the touch function. For example, the insulating layer 212 is provided between the first conductive layer 210 and the second conductive layer 211, and the bridge 2134 electrically connects two adjacent second sub-electrodes 2133 in a group of second sub-electrodes through at least two via holes extending through the insulating layer 212.

Figure 5F:
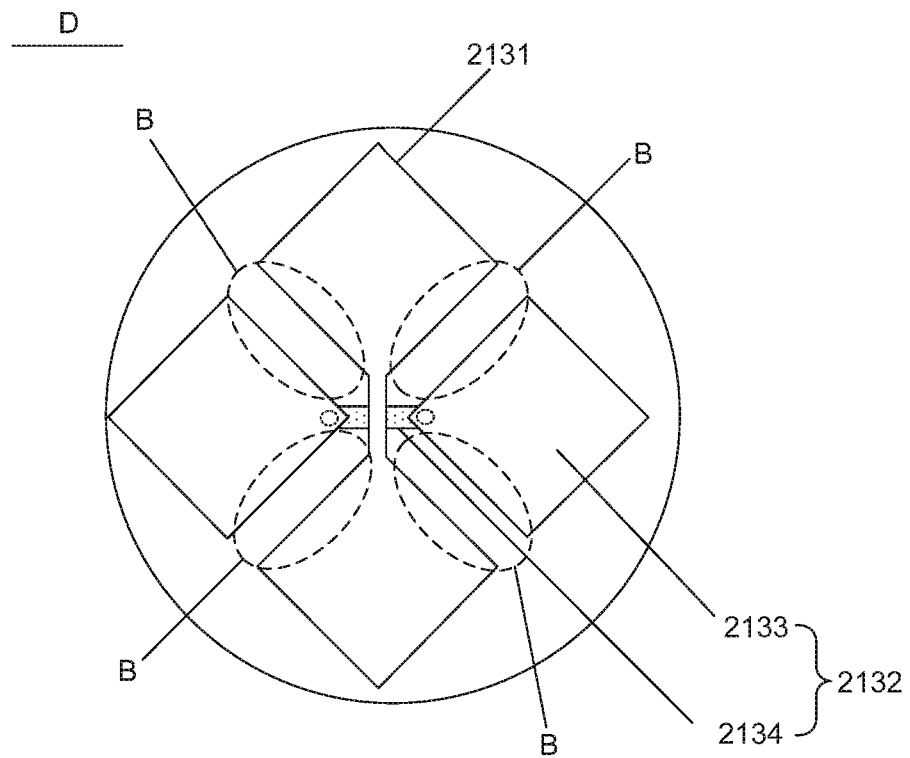
FIG. 5F is an enlarged diagram of the region D in FIG. 5E.
Figure 5G:
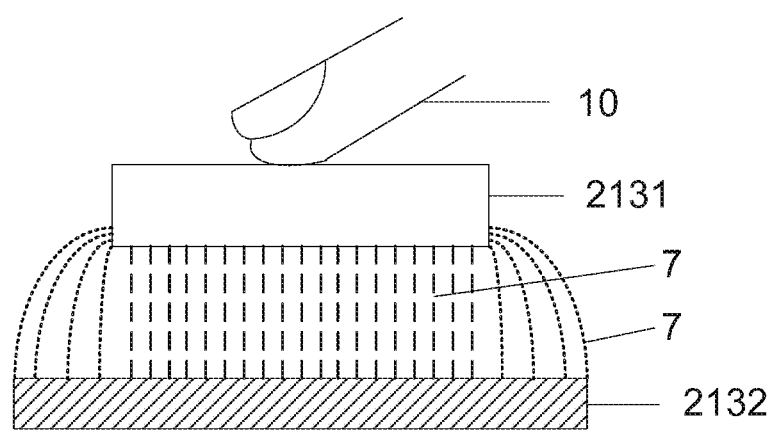
FIG. 5G is a schematic diagram of electric field lines between a first electrode and a second electrode according to some embodiments.

It will be known from the structures of the first conductive layer 210 and the second conductive layer 211 described above that the touch structure 2 provided in the embodiments of the present disclosure is a mutual-capacitive touch structure. That is, the first electrode 2131 is a sensing electrode and the second electrode 2132 is a driving electrode. A potential at the sensing electrode is different from a potential at the driving electrode, and an electric field may exist therebetween. When an user's finger approaches the touch functional layer 21, since the finger has a capacitive property, the electric field lines between the driving electrodes and the sensing electrodes may be attracted by the finger, which results that the mutual capacity between the sensing electrodes and the driving electrodes is decreased. In this way, the position where the finger touches may be identified. As shown in FIG. 5G, the electric field (which is marked by electric field lines 7) may be produced in a region between the first electrode 2131 and the second electrode 2132 and around the region. However, due to the shielding effect, most of the electric field lines 7 in the region between the first electrode 2131 and the second electrode 2132 are not greatly affected by the finger 10, and electric field lines 7 affected by the finger 10 are mainly distributed in the regions B as shown in FIGS. 5B, 5D and 5F.

Each of the first conductive layer 210 and the second conductive layer 211 may be obtained by patterning a conductive thin film. The first transparent layer 22 may not be patterned in the process of forming the first transparent layer 22.

The materials of the first conductive layer 210 and the second conductive layer 211 may be a transparent conductive material. The transparent conductive material is, for example, a transparent metal oxide, a conductive inorganic substance, or a conductive organic substance.

The materials of the first conductive layer 210 and the second conductive layer 211 may also be metal materials. In this case, the structures of the first electrode 2131 and the second electrode 2132 are metal mesh structures. The metal materials may include a metal elementary substance, a metal alloy, or the like. For example, the metal material is silver (Ag), copper (Cu), aluminum (Al), aluminum-niobium alloy (AlNb), or the like.

The first conductive layer 210 and the second conductive layer 211 may be made of silver nanowires (AgNW). The silver nanowire has better electrical conductivity, light transmittance, bendability and stability.

In some examples, the first conductive layer 210 is made of the silver nanowires, and the refractive index of the first conductive layer 210 is 1.4 to 1.5. The refractive index of the first transparent layer 22 is, for example, 1.8.

In some examples, the material of the first transparent layer 22 is an insulating material. For example, the insulating material is an organic substance, such as 2-Isocyanato-ethyl Acrylate-photosensitive resin (AOI-UV resin). For another example, the insulating material is an inorganic substance, such as titanium dioxide ($TiO_2$). The AOI-UV resin is, for example, obtained by modifying the UV resin (i.e., photosensitive resin) with 2-Isocyanatoethyl Acrylate, and the range of the refractive index of the AOI-UV resin is 1.65 to 1.8.

In some other examples, the material of the first transparent layer 22 is a conductive material. In this case, the first transparent layer 22 needs to be insulated from the first conductive layer 210 and the second conductive layer 211. That is, the touch structure 2 further includes another insulating layer between the first transparent layer 22 and the first conductive layer 210.

In the embodiments of the present disclosure, as shown in FIG. 4B, the incident light 8 from the environment to the touch structure 2 is converted into the first reflected light 81 after being reflected by the first transparent layer 22. Since the first transparent layer 22 shields the first conductive layer 210 below it, and the refractive index of the first transparent layer 22 is greater than or equal to the refractive index of the first conductive layer 210, most of the incident light 8 is reflected by the first transparent layer 22. However, the incident light 8 passing through the first transparent layer 22 travels to the first conductive layer 210 and is reflected by the first conductive layer 210, but the intensity of the reflected light is so weak that may be ignored, and thus light received by eyes mainly is the first reflected light 81. When the eyes receives light with a similar intensity substantially reflected by the same interface, it is impossible to identify the specific structure of the first conductive layer 210 below the first transparent layer 22 according to the intensity difference of the reflected light. Therefore, since the refractive index of the first transparent layer 22 is greater than or equal to the refractive index of the first conductive layer 210, the first transparent layer 22 has a light shielding effect on ambient light, and may achieve a shadow elimination effect on a pattern of the first conductive layer 210, so that the display effect of the touch display device is better.

In this way, in a case where the touch structure 2 is applied to a touch display device, as long as the first conductive layer 210 is closer to the light exit surface of the touch display device than the second conductive layer 211, the problem of afterimage caused by uneven intensity of the reflected light may be avoided.

Figure 4D:
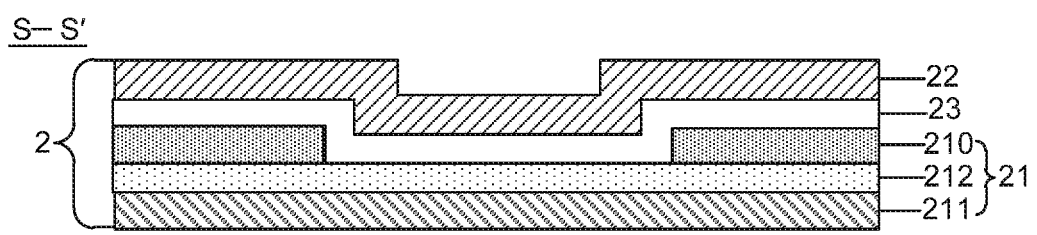
FIG. 4D is a cross-sectional view of yet another touch structure in the S-S' direction in FIG. 4A.
Figure 4E:
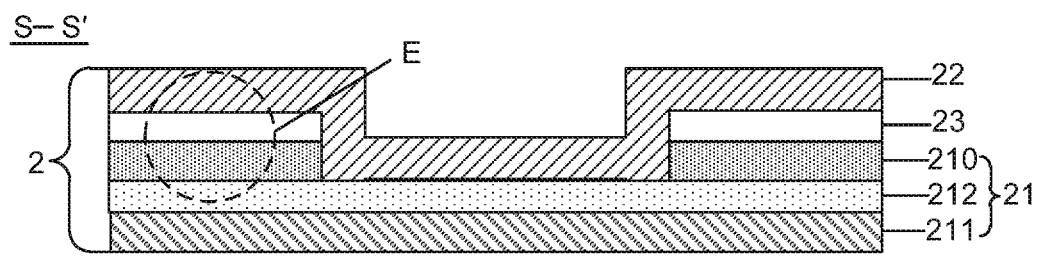
FIG. 4E is a cross-sectional view of yet another touch structure in the S-S' direction in FIG. 4A.

In some embodiments, as shown in FIGS. 4C to 4E, the touch structure 2 further includes a second transparent layer 23 disposed at a side of the first transparent layer 22 in the thickness direction of the touch functional layer 21, and the second transparent layer 23 is in contact with the first transparent layer 22. The refractive index of the second transparent layer 23 is less than the refractive index of the first transparent layer 22. In this case, both the first transparent layer 22 and the second transparent layer 23 are disposed at a side of the first conductive layer 210 away from the second conductive layer 211.

In some examples, as shown in FIG. 4C, the second transparent layer 23 is disposed at a side of the first transparent layer 22 away from the first conductive layer 210. An orthographic projection of the second transparent layer 23 on a plane perpendicular to the thickness direction of the touch functional layer 21 completely overlaps an orthographic projection of the first transparent layer 22 on the plane.

Herein, that an orthographic projection of the second transparent layer 23 on a plane perpendicular to the thickness direction of the touch functional layer 21 completely overlaps an orthographic projection of the first transparent layer 22 on the plane means that, without considering manufacturing errors, an edge of the second transparent layer 23 is aligned with a corresponding edge of the first transparent layer 22; and considering manufacturing errors, the edge of the second transparent layer 23 is very close to the corresponding edge of the first transparent layer 22. In this case, the second transparent layer 23 does not need to be patterned either. Both the first transparent layer 22 and the second transparent layer 23 cover a region where the entire touch functional layer 21 is located. For example, the touch structure 2 is applied to a touch display device, the touch functional layer 21 is located in the display area, and both the first transparent layer 22 and the second transparent layer cover the display area.

In some other examples, as shown in FIG. 4D, the second transparent layer 23 is disposed between the first transparent layer 22 and the first conductive layer 210, and the orthographic projection of the second transparent layer 23 on the plane perpendicular to the thickness direction of the touch functional layer 21 completely overlaps the orthographic projection of the first transparent layer 22 on the plane.

Herein, with respect to the meaning of "completely overlap", reference may be made to the aforesaid embodiments. In this case, the second transparent layer 23 does not need to be patterned either. Both the first transparent layer 22 and the second transparent layer 23 cover the region where the entire touch functional layer 21 is located. For example, the touch structure 2 is applied to a touch display device, the touch functional layer 21 is located in the display area, and both the first transparent layer 22 and the second transparent layer cover the display area.

In some other examples, as shown in FIG. 4E, the second transparent layer 23 is disposed between the first transparent layer 22 and the first conductive layer 210, and the orthographic projection of the second transparent layer 23 on the plane perpendicular to the thickness direction of the touch functional layer 21 completely overlaps the orthographic projection of the first conductive layer 210 on the plane.

Herein, that the orthographic projection of the second transparent layer 23 on the plane perpendicular to the thickness direction of the touch functional layer 21 completely overlaps the orthographic projection of the first conductive layer 210 on the plane means that, without considering manufacturing errors, an edge of each pattern in the second transparent layer 23 is aligned with an edge of a corresponding pattern in the first conductive layer 210; and considering manufacturing errors, the edge of each pattern in the second transparent layer 23 is very close to the edge of a corresponding pattern in the first conductive layer 210. In this case, the second transparent layer 23 and the first conductive layer 210 may be formed by a same patterning process, and the process is relatively simple.

For example, a material of the second transparent layer 23 is an insulating material. The insulating material may be an organic substance, or an inorganic substance, such as, silicon dioxide ($SiO_2$). For example, the first conductive layer 210 is made of the silver nanowires, and the refractive index of the second transparent layer 23 is, for example, 1.1 to 1.3.

Of course, the material of the second transparent layer 23 is not limited to the insulating material, and a suitable material may be selected according to the position of the second transparent layer 23. For example, as shown in FIG. 4C, the second transparent layer 23 is disposed at a side of the first transparent layer 22 away from the first conductive layer 210, and the material of the second transparent layer 23 is a conductive material.

In the embodiments, the second transparent layer 23 is used to achieve an anti-reflection effect to improve the transmittance of incident light from the second conductive layer 211 to the second transparent layer 23. The light may be visible light, for example, red light with a wavelength of approximately 770 nm to approximately 622 nm, green light with a wavelength of approximately 577 nm to approximately 492 nm, or blue light with a wavelength of approximately 492 nm to approximately 455 nm.

In an example where the incident light from the second conductive layer 211 to the second transparent layer 23 is visible light, the principle of anti-reflection of the second transparent layer 23 is described below.

Figure 4F:
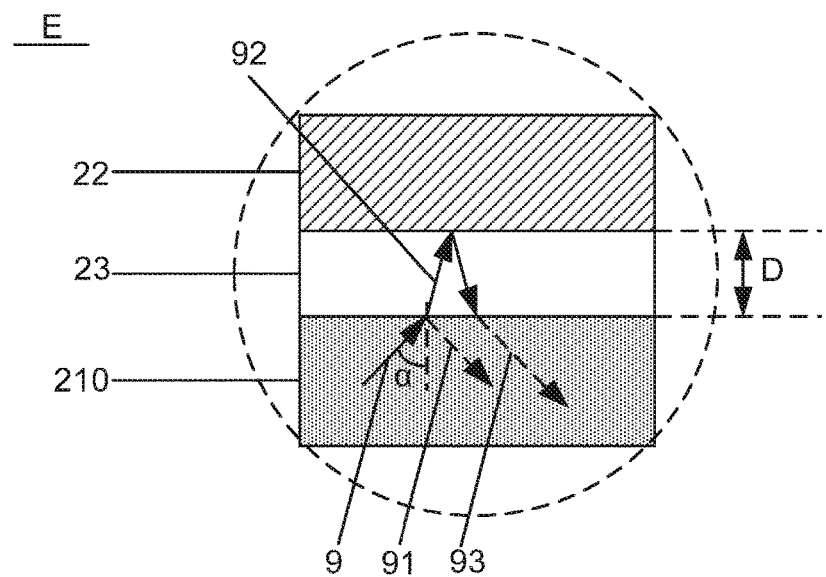
FIG. 4F is an enlarged diagram of the region E in FIG. 4E.

As shown in FIG. 4F, the reflectance $R_3$ of the second transparent layer 23 ($R_3$ is actually the reflectance of the film system composed of the first transparent layer 22 and the second transparent layer 23) may be obtained by the following equation (1):

$$R_3 = \frac{(n_1-n_2)^2 \cos^2\frac{\theta}{2} + \left(\frac{n_1 \times n_2}{n_3} - n_3\right)^2 \sin^2\frac{\theta}{2}}{(n_1+n_2)^2 \cos^2\frac{\theta}{2} + \left(\frac{n_1 \times n_2}{n_3} + n_3\right)^2 \sin^2\frac{\theta}{2}}; \quad (1)$$

where, $n_1$ is the refractive index of the first conductive layer 210, $n_2$ is the refractive index of the first transparent layer 22, $n_3$ is the refractive index of the second transparent layer 23, and $\theta$ is the phase difference between fourth reflected light 91 and fifth reflected light 93. The fourth reflected light 91 and the fifth reflected light 93 are the reflected light of visible light 9 at an interface between the second transparent layer 23 and the first conductive layer 210 and the reflected light of visible light 9 at an interface between the second transparent layer 23 and the first transparent layer 22, respectively.

For the first conductive layer 210 and the first transparent layer 22, both $n_1$ and $n_2$ are constants. It will be known from the above equation (1) that the reflectance $R_3$ of the second transparent layer 23 may change with the phase difference $\theta$ between the fourth reflected light 91 and the fifth reflected light 93.

The phase difference $\theta$ between the fourth reflected light 91 and the fifth reflected light 93 may be represented by the following equation (2):

$$\theta = (4\pi/\lambda) n_3 \times D \cos \alpha \quad (2);$$

where, $n_3$ is the refractive index of the second transparent layer 23, D is the thickness of the second transparent layer 23, $\lambda$ is the wavelength of the visible light 9, and $\alpha$ is the incident angle of the visible light 9 incident onto the second transparent layer 23.

In a case where the wavelength $\lambda$ and the incident angle $\alpha$ of the visible light 9 are fixed, it will be know from the equation (2) that the reflectance $R_3$ of the second transparent layer 23 changes with the optical thickness ($n_3$*D) of the second transparent layer 23. Assuming that visible light 9 is vertically incident on the second transparent layer 23 (i.e., $\alpha=0$), the equation (2) may be simplified as $\theta=(4\pi/\lambda)n_3 \times D$. The simplified $\theta$ is substituted into the equation (1) to obtain:

$$R_3 = \frac{(n_1-n_2)^2 \cos^2\left(\frac{2\pi}{\lambda} n_3 \times D\right) + \left(\frac{n_1 \times n_2}{n_3} - n_3\right)^2 \sin^2\left(\frac{2\pi}{\lambda} n_3 \times D\right)}{(n_1+n_2)^2 \cos^2\left(\frac{2\pi}{\lambda} n_3 \times D\right) + \left(\frac{n_1 \times n_2}{n_3} + n_3\right)^2 \sin^2\left(\frac{2\pi}{\lambda} n_3 \times D\right)}. \quad (3)$$

In a case where the second transparent layer 23 is not provided, the reflectance $R_2$ of the first transparent layer 22 may be represented by the following equation (4):

$$R_2 = \frac{(n_2-n_1)^2}{(n_2+n_1)^2}; \quad (4)$$

where, $n_1$ is the refractive index of the first conductive layer 210, and $n_2$ is the refractive index of the first transparent layer 22.

If the touch structure 2 can achieve the anti-reflection effect, the reflectance $R_3$ of the second transparent layer 23 (i.e., the reflectance of the film system composed of the first transparent layer 22 and the second transparent layer 23) is required to be less than the reflectance $R_2$ of the first transparent layer 22. According to the equations (3) and (4), it may be obtained that: only in a case where $n_3$ is less than $n_2$, the reflectance $R_3$ of the second transparent layer 23 is less than the reflectance $R_2$ of the first transparent layer 22.

In addition, for the second transparent layer 23, the sum of its transmittance and reflectance is equal to 1. Therefore, in a case where the refractive index of the second transparent layer 23 is less than the refractive index of the first transparent layer 22, the second transparent layer 23 may take an anti-reflection effect on the first transparent layer 22.

In this way, the reflectance $R_3$ of the overall structure composed of the second transparent layer 23 and the first transparent layer 22 for the incident visible light 9 from the second conductive layer 211 to the second transparent layer 23 may be less than the reflectance $R_2$ of the first transparent layer 22 (that is, the second transparent layer 23 is not provided) for the incident visible light 9 from the second conductive layer 211 to the first transparent layer 22. Therefore, the second transparent layer 23 improves the transmittance of the touch structure 2 for the visible light 9 and has an anti-reflection effect.

On this basis, as shown in FIGS. 4D and 4E, in a case where the second transparent layer 23 is located between the first transparent layer 22 and the first conductive layer 210, and the refractive index of the first transparent layer 22 is greater than the refractive index of the first conductive layer 210, the thickness D of the second transparent layer 23 is equal to $(2k+1)*\lambda/4$, and the refractive index $n_3$ of the second transparent layer 23 satisfies $n_3^2=n_1*n_2$. Herein, k is a natural number less than or equal to 10, $\lambda$ is the wavelength of the visible light, $n_1$ is the refractive index of the first conductive layer 210, $n_2$ is the refractive index of the first transparent layer 22, and $n_3$ is the refractive index of the second transparent layer 23.

As shown in FIG. 4F, after the incident visible light 9 passing through the first conductive layer 210 reaches the second transparent layer 23, the visible light 9 is reflected at the interface between the second transparent layer 23 and the first conductive layer 210 to obtain fourth reflected light 91; refracted light 92 of the visible light 9 entering the second transparent layer 23 is reflected at the interface between the second transparent layer 23 and the first transparent layer 22 and further refracted to obtain fifth reflected light 93. It can be seen from FIG. 4F that the optical path difference between the fourth reflected light 91 and the fifth reflected light 93 is substantially equal to twice the thickness D of the second transparent layer 23. In this case, in order to cause destructive interference between the fourth reflected light 91 and the fifth reflected light 93, the optical path difference between the fourth reflected light 91 and the fifth reflected light 93 is required to be an odd multiple of a half-wavelength of the visible light 9, i.e., $(2k+1)*\lambda/2$. So there exists $2D=(2k+1)*\lambda/2$, i.e., $D=(2k+1)*\lambda/4$.

It will be known that, in a case where the thickness D of the second transparent layer 23 is equal to $(2k+1)*\lambda/4$, destructive interference may always occur between the fourth reflected light 91 and the fifth reflected light 93, so the transmittance of the touch structure 2 may be further improved.

Furthermore, in order to cause destructive interference between the fourth reflected light 91 and the fifth reflected light 93 completely, the phase difference 9 between the fourth reflected light 91 and the fifth reflected light 93 is required to be equal to $\pi$. On this basis, $\theta=\pi$ is substituted into the equation (1) to obtain:

$$R_3 = \frac{\left(\frac{n_1 \times n_2}{n_3} - n_3\right)^2}{\left(\frac{n_1 \times n_2}{n_3} + n_3\right)^2}. \quad (5)$$

In order to make the reflectance $R_3$ of the second transparent layer 230 equal to 0, the refractive index of three layers (i.e., the first conductive layer 210, the second transparent layer 23, and the first transparent layer 22) may satisfy the equation $n_3^2=n_1*n_2$. On this basis, since the sum of reflectance $R_3$ of the second transparent layer 23 and the transmittance of the second transparent layer 23 is equal to 1, if the reflectance $R_3$ of the second transparent layer 23 is equal to 0, the transmittance of the second transparent layer 23 is equal to 1. In this case, the brightness of the refracted light 92 may reach a maximum, thereby further improving the transmittance of the touch structure 2 for the visible light 9.

Figure 6A:
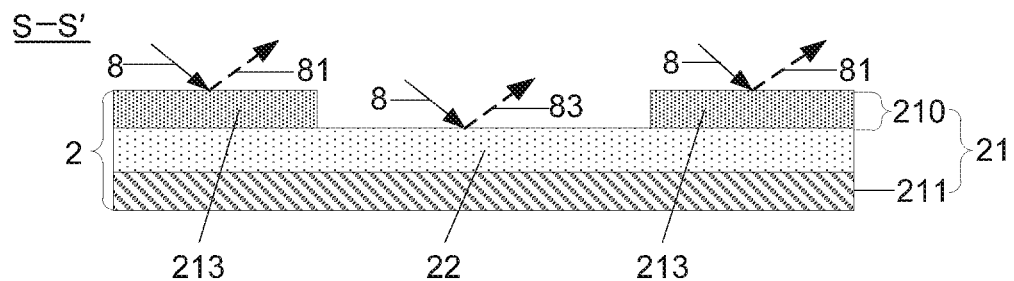
FIG. 6A is a cross-sectional view of yet another touch structure in the S-S' direction in FIG. 4A.
Figure 6B:
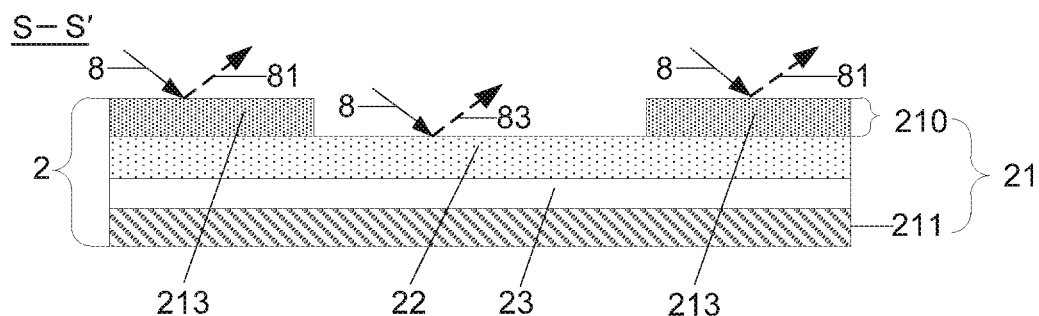
FIG. 6B is a cross-sectional view of yet another touch structure in the S-S' direction in FIG. 4A.
Figure 6C:
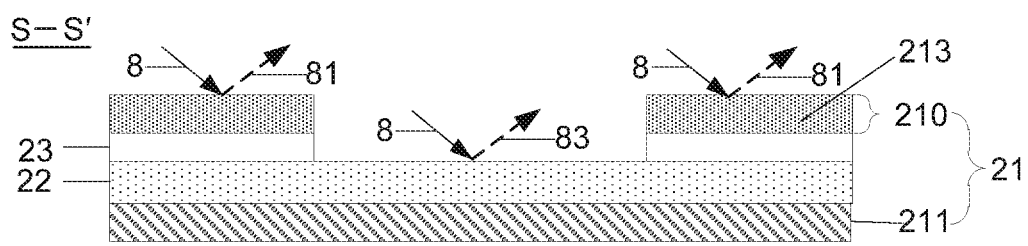
FIG. 6C is a cross-sectional view of yet another touch structure in the S-S' direction in FIG. 4A.

In some other embodiments of the present disclosure, a touch structure 2 of another structure is provided. As shown in FIGS. 6A to 6C, the touch structure 2 includes a touch functional layer 21 configured to identify a touch, and a first transparent layer 22.

The touch functional layer 21 includes a first conductive layer 210 and a second conductive layer 211 that are stacked, and the first conductive layer 210 includes a plurality of electrodes 213 that are spaced apart from each other.

The first transparent layer 22 is disposed between the first conductive layer 210 and the second conductive layer 211, and orthographic projections of the plurality of electrodes 213 in the first conductive layer 210 and a region between any two adjacent electrodes of the plurality of electrodes 213 on the plane perpendicular to the thickness direction of the touch functional layer 21 is within the range of the orthographic projection of the first transparent layer 22 on the plane. The material of the first transparent layer 22 is an insulating material. In this case, the first transparent layer 22 may replace the insulating layer 212 between the first conductive layer 210 and the second conductive layer 211. The refractive index of the first transparent layer 22 is equal to the refractive index of the first conductive layer 210. For example, the first transparent layer 22 is not patterned in the region in which the touch functional layer 21 is located.

In some examples, that the refractive index of the first transparent layer 22 is equal to the refractive index of the first conductive layer 210 means that the refractive index of the first transparent layer 22 is very close to or equal to the refractive index of the first conductive layer 210. For example, the difference between the refractive indexes of the two is ±0.1. Of course, this is only an exemplary illustration, and any technical solution of controlling the refractive index of the first transparent layer 22 to be close to the refractive index of the first conductive layer 210 to reduce the afterimage of the first conductive layer 210 is within the scope of the present disclosure.

In some embodiments, the touch structure 2 further includes a base configured to carry the first conductive layer 210, the second conductive layer 211, the first transparent layer 22, and electrode wires. For example, the touch structure 2 is disposed at a surface of a display panel, and the base of the touch structure 2 is a layer in the display panel disposed at the light exit surface of the display panel. For another example, the touch structure 2 is integrated into the display panel, and the base of the touch structure 2 is a certain layer in the display panel. That is, the layer at the surface of the display panel or the layer inside the display panel may be directly used as the base of the touch structure 2 on which structures, such as the first conductive layer 210 and the second conductive layer 211, are disposed. Of course, the touch structure 2 may also includes an independent base, and in a case where the touch structure is applied to a touch display device, the base of the touch structure 2 may be bond to the display panel.

In these embodiments, with respect to the structure of the touch functional layer 21, reference may be made to the structures of the aforesaid embodiments corresponding to FIG. 5A to FIG. 5F. In a case where the structure of the first conductive layer 210 is a structure as shown in FIG. 5A, the plurality of first electrodes 2131 in FIG. 5A are the plurality of electrodes 213 in the first conductive layer 210. In a case where the structure of the first conductive layer 210 is a structure as shown in FIGS. 5C and 5E, the plurality of first electrodes 2131 and the plurality of second sub-electrodes 2133 in FIGS. 5C and 5E are the plurality of electrodes 213 in the first conductive layer 210.

The material of the first transparent layer 22 is an insulating material. For example, the insulating material is an organic insulating material, such as 2-Isocyanatoethyl Acrylate-photosensitive resin (AOI-UV resin). For another example, the insulating material is an inorganic insulating material, such as titanium dioxide ($TiO_2$).

The first transparent layer 22 does not need to be patterned. That is, the first transparent layer 22 may cover the region where the entire touch functional layer 21 is located. Since the material of the first transparent layer 22 is an insulating material, it may serve as an insulating layer between the first conductive layer 210 and the second conductive layer 211. In this way, the overall thickness of the touch structure 2 may be reduced.

With respect to the materials and structures of the first conductive layer 210 and the second conductive layer 211, reference may be made to the related contents described in the above embodiments, and details are not described herein again.

In the embodiments, as shown in FIGS. 6A to 6C, the incident light 8 from the environment to the touch structure 2 is converted to the first reflected light 81 after being reflected by the first conductive layer 210, and converted to the third reflected light 83 after being reflected by the first transparent layer 22. Since the first transparent layer 22 and the first conductive layer 210 have the same refractive index, the intensity of the first reflected light 81 is equal to the intensity of the third reflected light 83. Therefore, the intensity of the reflected light entering the eyes is equal, and the eyes may not identify shapes of electrodes 213 in the first conductive layer 210. Therefore, the first transparent layer 22 achieves a shadow elimination effect on the structural patterns in the first conductive layer 210.

In this way, as long as the first conductive layer 210 is closer to the light exit surface of the touch display device than the second conductive layer 211 in a case where the touch structure 2 is applied to a touch display device, the problem of afterimage caused by uneven intensity of reflected light may be avoided.

In some embodiments, as shown in FIGS. 6B and 6C, the touch structure 2 further includes a second transparent layer 23 disposed on a side of the first transparent layer 22 in the thickness direction of the touch functional layer 21, and the second transparent layer 23 is in contact with the first transparent layer 22. The refractive index of the second transparent layer 23 is less than the refractive index of the first transparent layer 22.

In some examples, as shown in FIG. 6B, the second transparent layer 23 is disposed between the first transparent layer 22 and the second conductive layer 211, and the orthographic projection of the second transparent layer 23 on the plane perpendicular to the thickness direction of the touch functional layer 21 completely overlaps the orthographic projection of the first transparent layer 22 on the plane. In this case, the second transparent layer 23 does not need to be patterned, and both the first transparent layer 22 and the second transparent layer 23 cover the region where the entire touch function layer 21 is located. For example, the touch structure 2 is applied to a touch display device, the touch functional layer 21 is located in the display area, and both the first transparent layer 22 and the second transparent layer 23 cover the display area.

In some other examples, as shown in FIG. 6C, the second transparent layer 23 is disposed between the first conductive layer 210 and the first transparent layer 22, and the orthographic projection of the first conductive layer 210 on the plane perpendicular to the thickness direction of the touch functional layer 21 completely overlaps an orthographic projection of the second transparent layer 23 on the plane. In this case, the second transparent layer 23 and the first conductive layer 210 may be formed through a same patterning process, and the process is relatively simple.

In the touch structure 2 as shown in FIGS. 6B and 6C, the second transparent layer 23 is used to achieve an anti-reflection effect to improve the transmittance of incident visible light from the second conductive layer 211 to the second transparent layer 23, so that the brightness of the touch display device is improved. With respect to the principle of anti-reflection of the second transparent layer 23, reference may be made to the above embodiments, and details are not described herein again.

The material of the second transparent layer 23 may be an insulating material, such as an organic substance or an inorganic substance. For example, the material of the second transparent layer 23 is $SiO_2$, and its refractive index is 1.1 to 1.3. Herein, Tetraethyl orthosilicate (TEOS) and dimethyldiethoxylsilane (DDS) are subjected to a cohydrolysis-condensation reaction under an alkaline condition first, and then modified by hexamethyldisilazane (HMDS) to obtain the $SiO_2$ of the second transparent layer 23.

Of course, the material of the second transparent layer 23 is not limited to the insulating material, and a suitable material may be selected according to the position of the second transparent layer 23. For example, as shown in FIG. 6C, in the case where the second transparent layer 23 is disposed between the first transparent layer 22 and the first conductive layer 210 and both are formed through the same patterning process, the material of the second transparent layer 23 is a conductive material. In this case, both the second transparent layer 23 and the first conductive layer 210 serve as touch electrodes.

On this basis, the thickness D of the second transparent layer 23 is equal to $(2k+1)*\lambda/4$. Herein, k is a natural number less than or equal to 10, and $\lambda$ is the wavelength of the visible light.

In a case where the thickness D of the second transparent layer 23 is equal to $(2k+1)*\lambda/4$, as shown in FIG. 4F, the fourth reflected light 91 and the fifth reflected light 93 may destructively interfere, thereby improving the transmittance of the touch display device.

Some embodiments of the present disclosure provide a touch substrate including a base substrate and the touch structure 2 disposed above the base substrate.

In a case where the touch substrate is applied to a touch display device, the first conductive layer 210 is closer to the light exit surface of the touch display device than the second conductive layer 211. That is, the first conductive layer 210 is closer to a user standing in front of the touch display device.

In some examples, in a case where the touch substrate is applied to a touch display device, the touch substrate is directly bonded to a light exit surface of the liquid crystal display panel 1, a light exit surface of the electroluminescent display panel 4, or a light exit surface of the photoluminescence display panel. For example, the touch substrate is bonded to a surface of the upper polarizer 14 of the liquid crystal display panel 1 facing away from the liquid crystal layer 13. In this case, the second conductive layer 211 in the touch structure 2 is closer to the upper polarizer 14 than the first conductive layer 210.

In some examples, in a case where the touch substrate is applied to a touch display device, the base substrate of the touch substrate is the cover sheet 3 of the touch display device. In this case, the touch display device may be an one glass solution (OGS, i.e., integrated touch) touch screen. The first conductive layer 210 in the touch structure 2 is closer to the base substrate than the second conductive layer 211.

In an example where the touch structure 2 is applied to the liquid crystal display device as shown in FIG. 1A or applied to the electroluminescent display device as shown in FIG. 2B, light is emitted from a surface of the cover sheet 3 of the touch display device facing away from the touch structure 2, and thus the surface of the cover sheet 3 is the light exit surface of the touch display device.

Figure 7A:
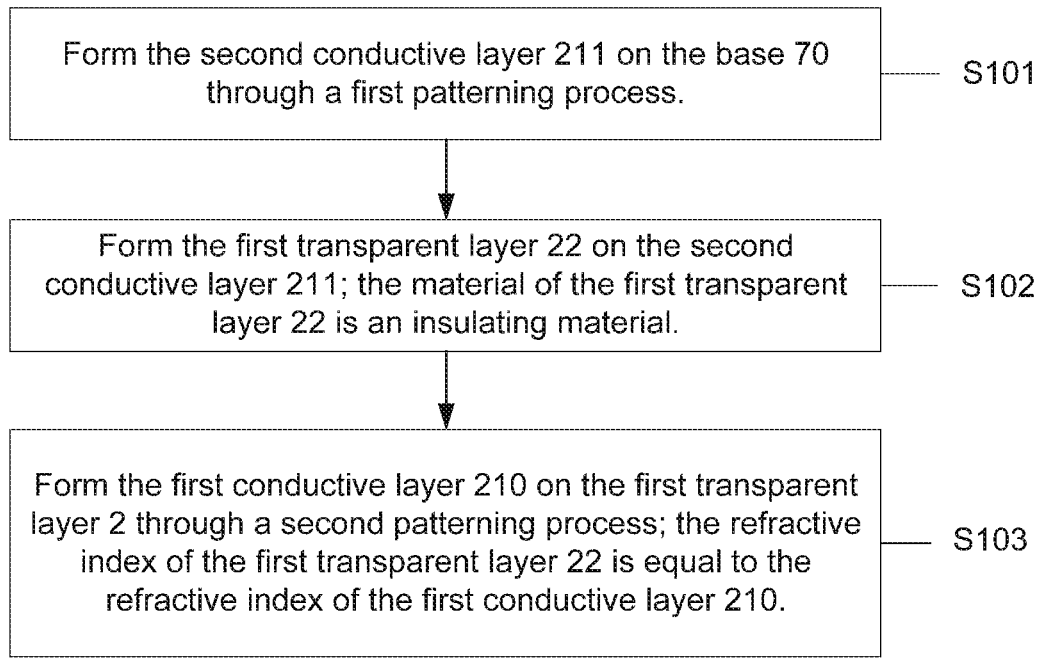
FIG. 7A is a flow chart of a method of manufacturing a touch structure according to some embodiments.

Some embodiments of the present disclosure provide a method of manufacturing the touch structure 2. As shown in FIG. 7A, the method includes S101 to S103.

Figure 7B:
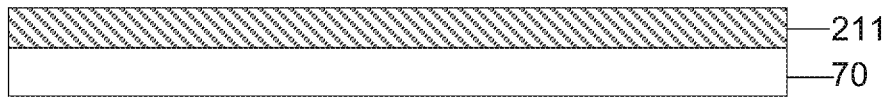
FIGS. 7B to 7D are schematic diagrams showing a manufacturing process of a touch structure according to some embodiments.

In S101, as shown in FIG. 7B, the second conductive layer 211 is formed on the base 70 through a first patterning process.

Herein, the base 70 may be a base on which no layer has been formed. Or, the base 70 may be a certain layer in the touch display device. For example, the touch structure 2 is disposed on a surface of a display panel or the touch structure 2 is integrated into the display panel, and the base 70 may be a layer disposed on the light exit surface of the display panel or a certain layer in the display panel. That is, the layer disposed on the surface of the display panel or inside the display panel is directly used as the base 70.

It will be understood that, in the embodiments of the present disclosure, the patterning process refers to a process of forming specific patterns of a layer using a mask, which includes exposure, development, etching and the like to form the specific patterns. The formed specific patterns may be continuous or discontinuous. The specific patterns may also be at different heights or have different thicknesses. "Patterning" and "patterned" means that a layer is processed by using the patterning process.

Figure 7C:
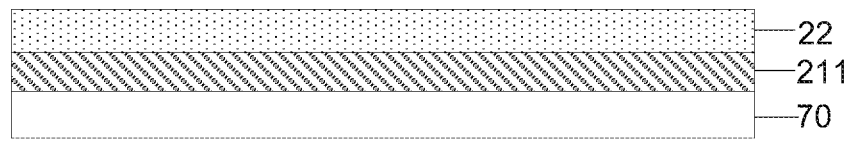

In S102, as shown in FIG. 7C, the first transparent layer 22 is formed on the second conductive layer 211. The material of the first transparent layer 22 is an insulating material.

A process of forming the first transparent layer 22 on the second conductive layer 211 may include any process for forming an entire layer, such as chemical vapor deposition (e.g., plasma enhanced chemical vapor deposition (PECVD)), sputtering, printing, coating, and spin coating.

Herein, the first transparent layer 22 may serve as an insulating layer between the second conductive layer 211 and the first conductive layer 210 to be formed.

In S103, as shown in FIG. 6A, the first conductive layer 210 is formed on the first transparent layer 22 through a second patterning process. The refractive index of the first transparent layer 22 is equal to the refractive index of the first conductive layer 210.

Herein, the first conductive layer 210 formed through a single patterning process includes a plurality of electrodes 213, and a part of the first transparent layer 22 is exposed by a gap between two adjacent electrodes 213 in the plurality of electrodes 213.

In the touch structure 2 formed by S101 to S103, the first conductive layer 210 and the second conductive layer 211 constitute a touch functional layer 21 configured to identify a touch. Since the first transparent layer 22 and the first conductive layer 210 have the same refractive index, it is possible to avoid the problem of afterimage caused by excessive reflectance of the first conductive layer 210.

The S103 of forming the first conductive layer 210 though the first patterning process, includes: forming a first conductive film on the first transparent layer 22, and patterning the first conductive film to form the first conductive layer 210.

For example, the material of the first conductive film is AgNW.

After the first transparent layer 22 is formed and before the first conductive film is formed, the method for manufacturing the touch structure 2 further includes S104.

Figure 7D:
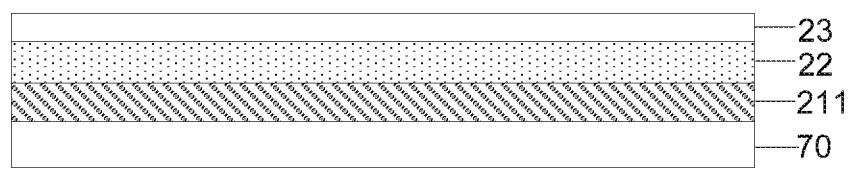

In S104, as shown in FIG. 7D, a second transparent film is formed on the first transparent layer 22.

On this basis, as shown in FIG. 6C, when the first conductive film is patterned in S103, the second transparent film is patterned simultaneously to form a second transparent layer 23. An orthographic projection of the second transparent layer 23 on the base 70 completely overlaps an orthographic projection of the first conductive layer 210 on the base 70.

For example, when the first conductive film is patterned, photoetching is simultaneously performed on the first conductive film and the second transparent film by a laser process to form the first conductive film 210 and the second transparent layer 23.

Herein, the laser process refers to a process of irradiating a film with a high-energy laser beam to perform a photoetching process on the film.

The method for manufacturing the touch structure 2 has the same beneficial effect as the touch structure 2 described above, and details are not described herein again.

Figure 8A:
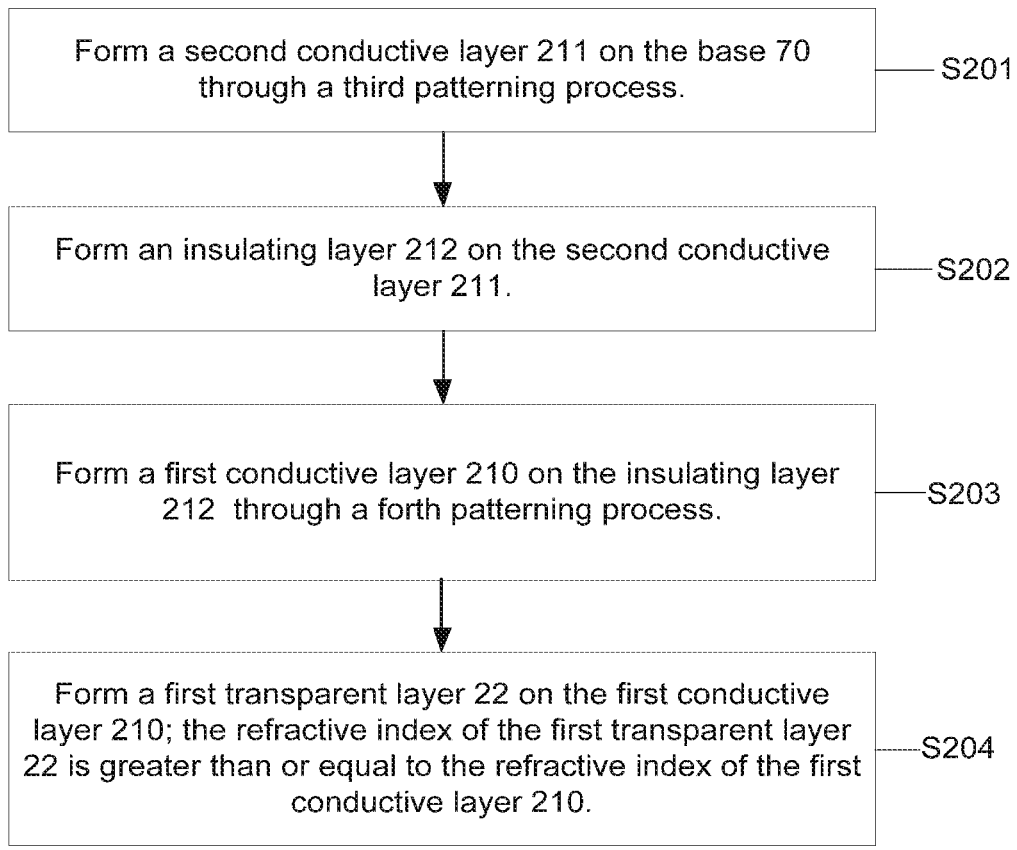
FIG. 8A is a flow chart of another method of manufacturing a touch structure according to some embodiments.

Some embodiments of the present disclosure provides another method of manufacturing the touch structure 2. As shown in FIG. 8A, the method includes S201 to S204.

In S201, as shown in FIG. 7B, the second conductive layer 211 is formed on the base 70 through a third patterning process.

Herein, the base 70 may be a base substrate on which no film layer has been formed. Or, the base 70 may be a certain layer in the display device. For example, in a case where the touch structure 2 is disposed on a surface of a display panel or the touch structure 2 is integrated into the display panel, the base 70 may be a layer disposed on the light exit surface of the display panel or a certain layer in the display panel. That is, the layer disposed on the surface of the display panel or inside the display panel may be directly used as the base 70.

Figure 8B:
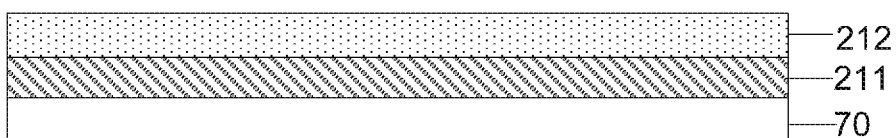
FIGS. 8B to 8C are schematic diagrams showing a manufacturing process of another touch structure according to some embodiments.

In S202, as shown in FIG. 8B, an insulating layer 212 is formed on the second conductive layer 211.

Figure 8C:
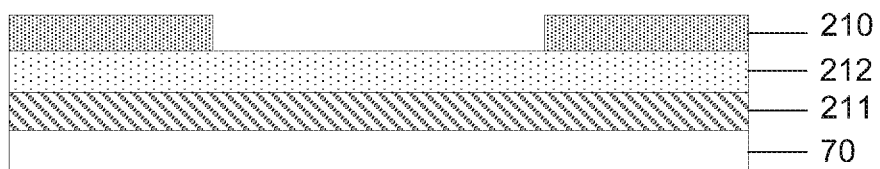

In S203, as shown in FIG. 8C, a first conductive layer 210 is formed on the insulating layer 212 through a fourth patterning process.

In S204, as shown in FIG. 4B, a first transparent layer 22 is formed on the first conductive layer 210. The refractive index of the first transparent layer 22 is greater than or equal to the refractive index of the first conductive layer 210.

In the touch structure 2 formed by S201 to S204, the first conductive layer 210 and the second conductive layer 211 constitute a touch functional layer 21 configured to identify a touch. Since the first transparent layer 22 shields the first conductive layer 210 below it, and the refractive index of the first transparent layer 22 is greater than or equal to the refractive index of the first conductive layer 210, it is possible to avoid the problem of afterimage caused by excessive reflectance of the first conductive layer 210.

For example, the material of the first conductive layer 210 is AgNW.

When the first conductive layer 210 is formed, the laser process may be used, but the method is not limited thereto.

After the first transparent layer 22 is formed, the method of manufacturing the touch structure 2 further includes S205.

In S205, as shown in FIG. 4C, a second transparent layer 23 is formed on the first transparent layer 22.

In a case where the second transparent layer 23 is an entire layer, that is, the second transparent layer 23 is not patterned, with respect to a process of forming the second transparent layer 23, reference may be made to the process of forming the first transparent layer 22, and details are not described herein again.

The method of manufacturing the touch structure 2 has the same beneficial effect as the touch structure 2 described above, and details are not described herein again.

The forgoing descriptions are merely specific implementation manners of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A touch structure, comprising:
   a touch functional layer configured to identify a touch, wherein the touch functional layer includes a first conductive layer and a second conductive layer that are stacked, and the first conductive layer includes a plurality of electrodes spaced apart from each other; and
   a first transparent layer, wherein orthographic projections of the plurality of electrodes and a region between any two adjacent electrodes of the plurality of electrodes on a plane perpendicular to a thickness direction of the touch functional layer is within a range of an orthographic projection of the first transparent layer on the plane, wherein
   the first transparent layer is disposed at a side of the first conductive layer away from the second conductive layer, and a refractive index of the first transparent layer is greater than or equal to a refractive index of the first conductive layer, or
   the first transparent layer is disposed between the first conductive layer and the second conductive layer, a material of the first transparent layer is an insulating material, and the refractive index of the first transparent layer is equal to the refractive index of the first conductive layer.

2. The touch structure according to claim 1, further comprising a second transparent layer, wherein
   the first transparent layer is disposed at the side of the first conductive layer away from the second conductive layer, the second transparent layer is disposed on a side of the first transparent layer in the thickness direction of the touch functional layer, and the second transparent layer is in contact with the first transparent layer; and
   a refractive index of the second transparent layer is less than the refractive index of the first transparent layer.

3. The touch structure according to claim 2, wherein an orthographic projection of the second transparent layer on the plane completely overlaps an orthographic projection of the first transparent layer on the plane.

4. The touch structure according to claim 2, wherein a thickness of the second transparent layer satisfies:

$$D=(2k+1)*\lambda/4,$$

wherein D is the thickness of the second transparent layer, k is a natural number less than or equal to 10, and $\lambda$ is a wavelength of visible light.

5. The touch structure according to claim 4, wherein the second transparent layer is disposed between the first transparent layer and the first conductive layer, and the refractive index of the second transparent layer satisfies:

$$n_3^2=n_1*n_2,$$

wherein $n_1$ is the refractive index of the first conductive layer, $n_2$ is the refractive index of the first transparent layer, $n_3$ is the refractive index of the second transparent layer, and the refractive index of the first conductive layer is not equal to the refractive index of the second conductive layer.

6. The touch structure according to claim 2, wherein a material of the second transparent layer is an insulating material.

7. The touch structure according to claim 1, further comprising a second transparent layer, wherein
   the first transparent layer is disposed between the first conductive layer and the second conductive layer, and the second transparent layer is disposed between the first transparent layer and the second conductive layer; and
   an orthographic projection of the second transparent layer on the plane completely overlaps an orthographic projection of the first transparent layer on the plane.

8. The touch structure according to claim 1, further comprising a second transparent layer, wherein
   the first transparent layer is disposed between the first conductive layer and the second conductive layer, and the second transparent layer is disposed between the first transparent layer and the first conductive layer; and
   an orthographic projection of the second transparent layer on the plane completely overlaps an orthographic projection of the first conductive layer on the plane.

9. The touch substrate according to claim 1, wherein the first conductive layer and the second conductive layer are made of silver nanowires.

10. A touch substrate, comprising a base substrate and the touch structure according to claim 1 disposed above the base substrate.

11. The touch substrate according to claim 10, wherein the base substrate is a cover sheet; and
    the first conductive layer in the touch structure is closer to the cover sheet than the second conductive layer.

12. A touch display device, comprising:
    a display panel; and
    the touch structure according to claim 1, wherein
    the first conductive layer in the touch structure is closer to a light exit surface of the touch display device than the second conductive layer.

13. The touch display device according to claim 12, wherein the display panel includes an array substrate, an opposite substrate, and a liquid crystal layer disposed between the array substrate and the opposite substrate; and
    the touch structure is disposed on a surface of the array substrate facing the liquid crystal layer.

14. The touch display device according to claim 12, wherein the display panel includes an array substrate, an opposite substrate, and a liquid crystal layer disposed between the array substrate and the opposite substrate; and
    the touch structure is disposed on a surface of the opposite substrate facing away from the liquid crystal layer.

15. The touch display device according to claim 12, wherein the display panel includes a display substrate and an encapsulation layer configured to encapsulate the display substrate; and the touch structure is disposed on a surface of the encapsulation layer facing away from the display substrate.

16. A method of manufacturing the touch structure according to claim 1, the method comprising:

forming the second conductive layer on a base through a first patterning process;

forming the first transparent layer on the second conductive layer, wherein a material of the first transparent layer is an insulating material; and forming the first conductive layer on the first transparent layer through a second patterning process, wherein the refractive index of the first transparent layer is equal to the refractive index of the first conductive layer.

17. The method according to claim 16, wherein forming the first conductive layer on the first transparent layer through the second patterning process, includes:

forming a first conductive film on the first transparent layer, and patterning the first conductive film to form the first conductive layer.

18. The method according to claim 17, wherein the first conductive film is made of silver nanowires, and the second patterning process includes a laser process.

19. The method according to claim 16, wherein after forming the first transparent layer, the method further comprises:

forming a second transparent film on the first transparent layer, and forming the first conductive layer includes:

forming a first conductive film on the second transparent film, wherein the first conductive film and the second transparent film are simultaneously processed through a same patterning process to form the first conductive layer and a second transparent layer, and an orthographic projection of the second transparent layer on the base completely overlaps an orthographic projection of the first conductive layer on the base.

* * * * *

UNITED STATES PATENT AND TRADEMARK OFFICE
CERTIFICATE OF CORRECTION

PATENT NO. : 11,029,789 B2
APPLICATION NO. : 16/860329
DATED : June 8, 2021
INVENTOR(S) : Wei Zhang et al.

Page 1 of 1

It is certified that error appears in the above-identified patent and that said Letters Patent is hereby corrected as shown below:

In the Drawings

Figure 3A should be depicted as follows:

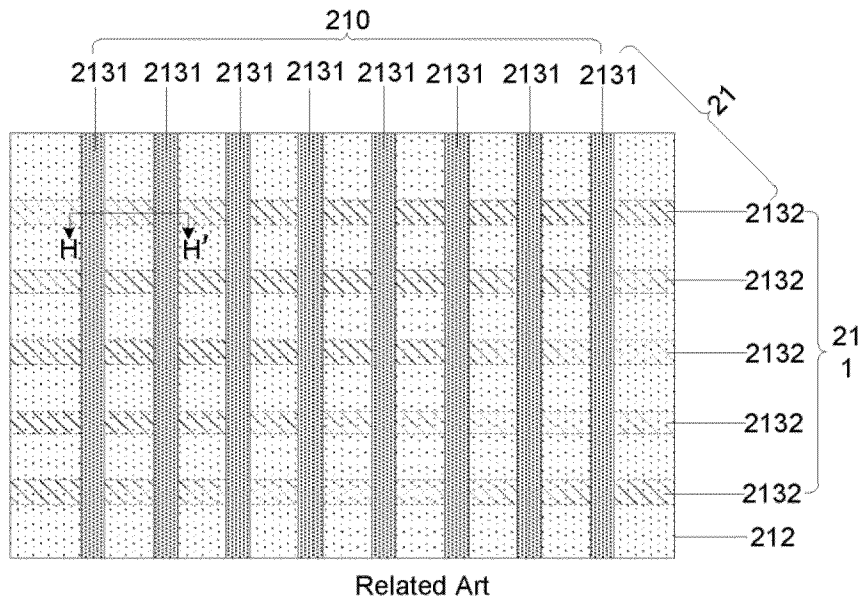

Related Art

In the Specification

Column 20, Line 11 should read:
In S104, as shown in FIG. 7D, a second transparent film is formed on the first transparent layer 22.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*